US012664599B2

(12) United States Patent
Wheeler et al.

(10) Patent No.: US 12,664,599 B2
(45) Date of Patent: Jun. 23, 2026

(54) SYSTEM AND METHOD FOR CAREER DEVELOPMENT

(71) Applicant: STATE FARM MUTUAL AUTOMOBILE INSURANCE COMPANY, Bloomington, IL (US)

(72) Inventors: Ross Wheeler, Scottsdale, AZ (US); Jose Ivan Gutierrez, Laveen, AZ (US); Lauren Mitchell, Phoenix, AZ (US); Anthony Welcome, Mesa, AZ (US); Steve Amancha, Tempe, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 123 days.

(21) Appl. No.: 18/377,173

(22) Filed: Oct. 5, 2023

(65) Prior Publication Data

US 2024/0412313 A1     Dec. 12, 2024

Related U.S. Application Data

(60) Provisional application No. 63/534,489, filed on Aug. 24, 2023, provisional application No. 63/471,404, filed on Jun. 6, 2023.

(51) Int. Cl.
G06Q 50/20        (2012.01)
G06F 40/30        (2020.01)
          (Continued)

(52) U.S. Cl.
CPC ......... G06Q 50/2057 (2013.01); G06F 40/30 (2020.01); G06N 3/006 (2013.01);
          (Continued)

(58) Field of Classification Search
CPC ....... G06Q 50/2057; G06Q 10/063112; G06Q 10/06395; G06Q 10/06398; G06F 40/30; G06N 3/006; G06N 5/022
See application file for complete search history.

(56) References Cited

U.S. PATENT DOCUMENTS 7,523,060 B1     4/2009   Tenorio
8,682,804 B1     3/2014   Yoon
          (Continued)

FOREIGN PATENT DOCUMENTS

CN       110175229 A      8/2019
CN       114742657 A      7/2022
          (Continued)

OTHER PUBLICATIONS

Suresh, Nalina, et al. "Career counseling chatbot on Facebook messenger using AI." Proceedings of the International Conference on Data Science, Machine Learning and Artificial Intelligence. 2021. (Year: 2021).*
          (Continued)

*Primary Examiner* — Asfand M Sheikh
(74) *Attorney, Agent, or Firm* — MARSHALL, GERSTEIN & BORUN LLP

(57)          ABSTRACT

Apparatuses, systems, and methods are provided for career development are provided. The method comprises: (1) receiving, by one or more processors from a user device, an information element associated with a user; (2) generating, by the one or more processors via a chatbot, career development suggestions based upon the information element associated with the user; and/or (3) presenting, by the one or more processors to the user via the user device, the career development suggestions. The chatbot may implement a trained model.

17 Claims, 13 Drawing Sheets

(51) Int. Cl.

| | |
|---|---|
| *G06N 3/006* | (2023.01) |
| *G06N 5/022* | (2023.01) |
| *G06Q 10/0631* | (2023.01) |
| *G06Q 10/0639* | (2023.01) |

(52) U.S. Cl.
CPC ..... *G06N 5/022* (2013.01); *G06Q 10/063112* (2013.01); *G06Q 10/06395* (2013.01); *G06Q 10/06398* (2013.01)

(56) References Cited

U.S. PATENT DOCUMENTS

| | | | |
|---|---|---|---|
| 10,107,708 B1 | 10/2018 | Schick et al. | |
| 10,409,995 B1 | 9/2019 | Wasiq et al. | |
| 10,733,383 B1 * | 8/2020 | Shah | G06F 40/216 |
| 11,017,466 B1 | 5/2021 | Cunningham et al. | |
| 11,238,521 B2 | 2/2022 | Malkiel et al. | |
| 11,270,331 B1 | 3/2022 | Breitweiser et al. | |
| 11,314,846 B1 * | 4/2022 | Colin | G16H 40/40 |
| 11,444,893 B1 | 9/2022 | Kalluri | |
| 11,538,112 B1 | 12/2022 | Singh et al. | |
| 11,593,685 B1 | 2/2023 | Chan et al. | |
| 11,595,243 B1 | 2/2023 | Schreiber et al. | |
| 11,645,253 B1 | 5/2023 | Xing et al. | |
| 11,676,202 B1 | 6/2023 | Latronico et al. | |
| 11,726,889 B1 | 8/2023 | Rao et al. | |
| 11,763,148 B2 | 9/2023 | Milman et al. | |
| 11,769,013 B2 | 9/2023 | Machado et al. | |
| 11,803,849 B1 | 10/2023 | Lawrence | |
| 11,900,451 B1 | 2/2024 | King et al. | |
| 11,929,963 B1 | 3/2024 | Zheng | |
| 11,942,079 B2 | 3/2024 | Chun et al. | |
| 11,989,636 B1 | 5/2024 | Leeds et al. | |
| 12,181,844 B2 | 12/2024 | Ramanasankaran et al. | |
| 2006/0195335 A1 * | 8/2006 | Christian | G06Q 10/06398 705/7.42 |
| 2007/0233535 A1 | 10/2007 | Kim | |
| 2008/0196099 A1 | 8/2008 | Shastri | |
| 2010/0161503 A1 * | 6/2010 | Foster | G06Q 10/1053 705/321 |
| 2012/0054040 A1 | 3/2012 | Bagherjeiran et al. | |
| 2013/0191223 A1 | 7/2013 | Harris et al. | |
| 2015/0128246 A1 | 5/2015 | Feghali et al. | |
| 2016/0156574 A1 | 6/2016 | Hum et al. | |
| 2016/0260033 A1 * | 9/2016 | Keyngnaert | G06F 17/18 |
| 2016/0379284 A1 | 12/2016 | Alizadeh et al. | |
| 2017/0353991 A1 | 12/2017 | Tapia | |
| 2018/0013783 A1 | 1/2018 | Anachi | |
| 2018/0121657 A1 | 5/2018 | Hay et al. | |
| 2018/0121808 A1 | 5/2018 | Ramakrishna et al. | |
| 2018/0150739 A1 | 5/2018 | Wu | |
| 2018/0189739 A1 * | 7/2018 | Kenthapadi | G06F 16/9535 |
| 2018/0253780 A1 | 9/2018 | Wang et al. | |
| 2019/0005024 A1 | 1/2019 | Somech et al. | |
| 2019/0087865 A1 | 3/2019 | Loree et al. | |
| 2019/0089725 A1 | 3/2019 | Anachi | |
| 2019/0122232 A1 | 4/2019 | Leidi et al. | |
| 2019/0141058 A1 | 5/2019 | Hassanzadeh et al. | |
| 2019/0303798 A1 * | 10/2019 | Xie | G06Q 50/01 |
| 2020/0012958 A1 | 1/2020 | Natanson et al. | |
| 2020/0053117 A1 | 2/2020 | Mandal | |
| 2020/0133756 A1 | 4/2020 | Sun et al. | |
| 2020/0184017 A1 | 6/2020 | Batra et al. | |
| 2020/0258045 A1 | 8/2020 | Knupfer | |
| 2020/0259700 A1 | 8/2020 | Bhalla et al. | |
| 2020/0259701 A1 | 8/2020 | Povoa | |
| 2020/0272994 A1 * | 8/2020 | Silveira | G06N 20/20 |
| 2020/0327172 A1 | 10/2020 | Coquard et al. | |
| 2020/0334580 A1 * | 10/2020 | Sheopuri | G06F 40/56 |
| 2020/0342032 A1 | 10/2020 | Subramaniam et al. | |
| 2020/0372823 A1 | 11/2020 | Edwards et al. | |
| 2021/0021636 A1 | 1/2021 | Sbandi | |
| 2021/0056007 A1 | 2/2021 | Viswanathan et al. | |
| 2021/0081819 A1 | 3/2021 | Polleri et al. | |
| 2021/0083994 A1 | 3/2021 | Pan et al. | |

| | | | |
|---|---|---|---|
| 2021/0133807 A1 | 5/2021 | Kini et al. | |
| 2021/0141862 A1 * | 5/2021 | Huang | G06N 3/044 |
| 2021/0166244 A1 | 6/2021 | Basam | |
| 2021/0232613 A1 | 7/2021 | Raval et al. | |
| 2021/0249017 A1 | 8/2021 | Burris et al. | |
| 2021/0312561 A1 | 10/2021 | Speasl et al. | |
| 2021/0326757 A1 | 10/2021 | Rawat et al. | |
| 2021/0342918 A1 | 11/2021 | Price et al. | |
| 2021/0342946 A1 | 11/2021 | Leise et al. | |
| 2021/0349955 A1 | 11/2021 | Megill et al. | |
| 2021/0374168 A1 * | 12/2021 | Srinivasan | G06V 10/82 |
| 2022/0004479 A1 | 1/2022 | McCawley et al. | |
| 2022/0012357 A1 | 1/2022 | Rajeev | |
| 2022/0094649 A1 | 3/2022 | Le | |
| 2022/0107858 A1 | 4/2022 | Jain et al. | |
| 2022/0129261 A1 | 4/2022 | Cabrera et al. | |
| 2022/0138161 A1 | 5/2022 | Anjum et al. | |
| 2022/0138690 A1 | 5/2022 | Anjum et al. | |
| 2022/0148113 A1 | 5/2022 | Mejia et al. | |
| 2022/0156298 A1 | 5/2022 | Mahmoud et al. | |
| 2022/0229860 A1 | 7/2022 | Ship et al. | |
| 2022/0229978 A1 | 7/2022 | Ship et al. | |
| 2022/0244847 A1 | 8/2022 | Margot et al. | |
| 2022/0261711 A1 | 8/2022 | Krishna et al. | |
| 2022/0270120 A1 | 8/2022 | King | |
| 2022/0308943 A1 | 9/2022 | Srinivasan et al. | |
| 2022/0358225 A1 | 11/2022 | Gadde et al. | |
| 2022/0374483 A1 | 11/2022 | Hunt | |
| 2022/0374598 A1 * | 11/2022 | Osuala | G06F 40/279 |
| 2022/0398492 A1 | 12/2022 | Navon et al. | |
| 2022/0400159 A1 * | 12/2022 | Chi | G06N 3/084 |
| 2023/0018065 A1 | 1/2023 | Schmitt et al. | |
| 2023/0033680 A1 | 2/2023 | Whatley | |
| 2023/0080589 A1 | 3/2023 | Gupta et al. | |
| 2023/0080724 A1 | 3/2023 | Stoops et al. | |
| 2023/0092651 A1 * | 3/2023 | Joshi | G06F 40/284 704/9 |
| 2023/0099424 A1 | 3/2023 | Hawkinson et al. | |
| 2023/0110941 A1 * | 4/2023 | Makhija | G06F 40/284 709/224 |
| 2023/0124948 A1 | 4/2023 | Li et al. | |
| 2023/0135162 A1 | 5/2023 | Cohen et al. | |
| 2023/0252342 A1 * | 8/2023 | Stewart | G06N 3/08 706/12 |
| 2023/0273783 A1 | 8/2023 | Molander et al. | |
| 2023/0297887 A1 * | 9/2023 | Gurgu | G06N 20/00 706/12 |
| 2023/0316141 A1 | 10/2023 | Toporek et al. | |
| 2023/0316339 A1 | 10/2023 | Anderson et al. | |
| 2023/0367669 A1 | 11/2023 | Tiwari et al. | |
| 2023/0386657 A1 | 11/2023 | Pascal et al. | |
| 2023/0396568 A1 | 12/2023 | Lutsyshyn | |
| 2023/0401387 A1 | 12/2023 | Alexander et al. | |
| 2023/0401660 A1 | 12/2023 | Ambrosch et al. | |
| 2024/0037343 A1 | 2/2024 | Miller et al. | |
| 2024/0037896 A1 | 2/2024 | Zhang et al. | |
| 2024/0061835 A1 | 2/2024 | Subramanian et al. | |
| 2024/0144372 A1 | 5/2024 | Wu et al. | |
| 2024/0169163 A1 | 5/2024 | Nguyen | |
| 2024/0171480 A1 | 5/2024 | Sheoran et al. | |
| 2024/0194180 A1 | 6/2024 | Goldshtein et al. | |
| 2024/0202452 A1 | 6/2024 | Schillace et al. | |
| 2024/0202457 A1 | 6/2024 | Yogerst et al. | |
| 2024/0202571 A1 * | 6/2024 | Yaghi | G06F 18/22 |
| 2024/0202572 A1 * | 6/2024 | Morales | G06F 18/217 |
| 2024/0211799 A1 | 6/2024 | Mazor | |
| 2024/0220674 A1 | 7/2024 | Lopez et al. | |
| 2024/0249318 A1 | 7/2024 | Spiegel et al. | |
| 2024/0256429 A1 | 8/2024 | Lucioni et al. | |
| 2024/0257209 A1 | 8/2024 | Wang et al. | |
| 2024/0267243 A1 | 8/2024 | Ning et al. | |
| 2024/0267344 A1 | 8/2024 | Mulligan et al. | |
| 2024/0281677 A1 | 8/2024 | Mifflin | |
| 2024/0281706 A1 | 8/2024 | Marzinzik et al. | |
| 2024/0283697 A1 | 8/2024 | Bates-Maricle | |
| 2024/0289113 A1 | 8/2024 | Bates-Maricle | |
| 2024/0289872 A1 | 8/2024 | Fields et al. | |
| 2024/0291777 A1 | 8/2024 | Fields et al. | |
| 2024/0291778 A1 | 8/2024 | Fields et al. | |

(56)  References Cited

U.S. PATENT DOCUMENTS

| | | |
|---|---|---|
| 2024/0291779 A1 | 8/2024 | Catalano et al. |
| 2024/0291785 A1 | 8/2024 | Fields et al. |
| 2024/0296489 A1 | 9/2024 | Brannan |
| 2024/0311618 A1 | 9/2024 | Sukhavasi et al. |
| 2024/0330151 A1 | 10/2024 | Williams et al. |
| 2024/0330455 A1 | 10/2024 | Sahu |
| 2024/0330504 A1 | 10/2024 | Williams et al. |
| 2024/0330654 A1 | 10/2024 | Williams et al. |
| 2024/0331043 A1 | 10/2024 | Williams et al. |
| 2024/0333728 A1 | 10/2024 | Williams et al. |
| 2024/0333746 A1 | 10/2024 | Williams et al. |
| 2024/0394503 A1 | 11/2024 | Gutierrez et al. |
| 2024/0394593 A1 | 11/2024 | Gutierrez et al. |
| 2024/0403566 A1 | 12/2024 | Sengupta et al. |
| 2024/0412145 A1* | 12/2024 | Wheeler .......... G06Q 10/06398 |
| 2024/0412168 A1* | 12/2024 | Shrader .................. G06N 5/048 |
| 2024/0428259 A1 | 12/2024 | Wheeler et al. |
| 2024/0430702 A1 | 12/2024 | Chandran et al. |
| 2025/0022071 A1 | 1/2025 | Gutierrez et al. |
| 2025/0029192 A1 | 1/2025 | Wheeler et al. |

FOREIGN PATENT DOCUMENTS

| | | |
|---|---|---|
| JP | 2019-514117 A | 5/2019 |
| KR | 10-2023-0018065 A | 2/2023 |
| KR | 10-2619905 B1 | 1/2024 |
| WO | 2020/198392 A1 | 10/2020 |
| WO | 2021/092164 A1 | 5/2021 |
| WO | 2024/112887 A1 | 5/2024 |

OTHER PUBLICATIONS

Arshad, T. K., et al. "VocaVisionary: A Career Guidance Chatbot." 2024 Second International Conference on Advances in Information Technology (ICAIT). vol. 1. IEEE, 2024. (Year: 2024).*

Prakash, Sajay, Koushik Sundar, and Eashaan Manohar. "Career Connect-A Personalized Job Recommendation Al Chatbot." ( 2024). (Year: 2024).*

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Panjaitan, Hapizin Yonani, and Renny Risqiani. "Antecedents of Customer Satisfaction Towards Chatbot on Used Car Buying and Selling Platforms in Indonesia." APMBA (Asia Pacific Management and Business Application) 12.3 (2024): 315-334.

Unknown, "GPT-3 vs GPT-4 | What's the difference?", Jan. 2023, botpress.com, web.archive.org/web/20230131033431/https://botpress.com/blog/gpt-3-vs-gpt-4-whats-the-difference (Year: 2023).

Bodea, Constanta-Nicoleta, Maria-Iuliana Dascalu, and Alexandru Hang. "Chatbot-based training for project management: . . . " Research on project, programme and portfolio management: Integrating sustainability into project management. Springer International Publishing, 2021. (Year: 2021).

Casillo et al. "Chatbot in industry 4.0: An approach for training new employees." 2020 IEEE International Conference on Teaching, Assessment, and Learning for Engineering (TALE). IEEE, 2020. (Year: 2020).

Clarizia et al. "E-learning and industry 4.0: A chatbot for training employees." Proceedings of Fifth International Congress on Information and Communication Technology: ICICT 2020, London, vol. 2. Springer Singapore, 2021. (Year: 2021).

Dovetail Software. "The Ultimate Guide to Conversational AI Chatbots for HR." Dovetail Software Blog, Mar. 12, 2022 (last accessed on Jul. 8, 2025 at https://blog.dovetailsoftware.com/hr/ultimate-guide-to-ai-chatbots-for-hr). (Year: 2020).

English language translation of above-mentioned CN Pat. App. Pub. No. 110175229 A to Chen et al. (Year: 2019).

Grensing-Pophal, Lin. "How HR Is Using Virtual Chat and Chatbots." SHRM News, May 24, 2022 (last accessed on Jul. 8, 2025 at https://www.shrm.org/topics-tools/news/technology/how-hr-using-virtual-chat-chatbots). (Year: 2022).

Nguyen et al., "Deep Learning and Handheld Augmented Reality Based System for Optimal Data Collection in Fault Diagnostics Domain."arXiv preprint arXiv:2206.07772 (2022). (Year: 2022).

Shao, "Communication Fault Diagnosis Algorithm Based on BP Neural Network" 2021 3rd International Conference on Intelligent Control, Measurement and Signal Processing and Intelligent Oil Field (ICMSP), Xi'an, China, 2021, pp. 239-243, doi: 10.1109/ICMSP53480.2021.9513359. (Year: 2021).

JP 2019514117A (Machine translation); 2025 (Year: 2025).

Ouyang et al., Training language models to follow instructions with human feedback, Cornell University (Mar. 4, 2022).

Yager, "Domain-Specific chatbots for science using embeddings", Jun. 2023, Royal Society of Chemistry, pp. 1-12, downloaded from https://pubs.rsc.org/en/content/articlepdf/2023/dd/d3dd00112a, DOI: 10.1039/D3DD00112A (Year: 2023).

* cited by examiner

400

RECEIVE AN ANSWER ASSOCIATED WITH A QUESTION

410

GENERATE VALUES ASSOCIATED WITH ONE OR MORE METRICS OF THE ANSWER

412

PERFORM AT LEAST ONE OF THE FOLLOWING:

414

DETERMINE A SKILL LEVEL

416

PRESENT A SECOND QUESTION

418

PRESENT AN EXPLANATION

420

600

602  RECEIVE AN INFORMATION ELEMENT ASSOCIATED WITH A USER

604  GENERATE CAREER DEVELOPMENT SUGGESTIONS BASED ON THE INFORMATION ELEMENT

606  PRESENT THE CAREER DEVELOPMENT SUGGESTIONS

SYSTEM AND METHOD FOR CAREER DEVELOPMENT

CROSS-REFERENCE TO RELATED APPLICATIONS

This application claims priority to and the benefit of the filing date of (1) provisional U.S. Patent Application No. 63/471,404 entitled "SYSTEM AND METHOD FOR TRAINING EMPLOYEES AND CAREER DEVELOP-MENT," filed on Jun. 6, 2023, and (2) provisional U.S. Patent Application No. 63/534,489 entitled "SYSTEM AND METHOD FOR TRAINING EMPLOYEES AND CAREER DEVELOPMENT," filed on Aug. 24, 2023. The entire disclosure of each of the above-identified applications is hereby expressly incorporated herein by reference.

FIELD OF THE INVENTION

The present disclosure generally relates to systems and methods for training employees and career development, and more particularly, using chatbots or other bots for training employees and career development.

BACKGROUND

Employee training is an essential aspect of human resource management, as it may help to improve the productivity, quality, and efficiency of the workforce. Training employees by human trainers may be costly, time-consuming, and inflexible. Traditional computing systems for training employees may fail to provide customized, interactive training and may thus be ineffective or inefficient.

Career development is a process of exploring, planning, and pursuing one's professional aspirations and opportunities. Providing career development suggestions can be challenging and complex. Seeking career development suggestions from human professionals may be costly. Traditional computing systems for providing career development suggestions may fail to provide customized, interactive advice in view of the current labor market.

The conventional employee training and career development techniques may include additional ineffectiveness, inefficiencies, encumbrances, and/or other drawbacks.

SUMMARY

The present embodiments may relate to, inter alia, systems and methods for training employee and career development using a chatbot, a voice bot, or other bot.

In one aspect, a computer-implemented method for training employees may be provided. The computer-implemented method may be implemented via one or more local or remote processors, servers, transceivers, sensors, memory units, mobile devices, wearables, smart watches, smart contact lenses, smart glasses, augmented reality (AR) glasses, virtual reality (VR) headsets, mixed reality (MR) or extended reality glasses or headsets, voice bots or chatbots, ChatGPT or ChatGPT-based bots, and/or other electronic or electrical components, which may be in wired or wireless communication with one another. For example, in one instance, the computer-implemented method may include: (1) receiving, by one or more processors from a user device associated with an employee, an answer associated with a question; (2) generating, by the one or more processors via a chatbot (or other bot), values associated with one or more metrics of the answer; and/or (3) performing, by the one or more processors, at least one of the following: (i) determining a skill level of the employee based upon the values associated with the one or more metrics of the answer; (ii) presenting, to the employee via the user device, a second question based upon the values associated with the one or more metrics of the answer; and/or (iii) presenting, to the employee via the user device, an explanation based upon the values associated with the one or more metrics of the answer. The chatbot in the method may implement a trained model. Training the model may include: (a) creating a first set of vectors associated with a first training data; (b) training the model in a first stage using the first set of vectors; (c) creating a second set of vectors associated with a second training data, wherein the second training data includes objects comprising questions, answers associated with the questions, values associated with metrics of the answers, and/or prompts for evaluating the answers; and/or (d) training the model in a second stage using the second set of vectors. The method may include additional, less, or alternate functionality or actions, including those discussed elsewhere herein.

In another aspect, a computer system for training employees may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT or ChatGPT-based bots, and/or other electronic or electrical components, which may be in wired or wireless communication with one another. For example, in one instance, the computer system may include one or more processors, and a non-transitory memory storing one or more instructions, the instructions, when executed by the one or more processors, cause the one or more processors to: (1) receive, from a user device associated with an employee, an answer associated with a question; (2) generate, via a chatbot, values associated with one or more metrics of the answer; and/or (3) perform at least one of the following: (i) determine a skill level of the employee based upon the values associated with the one or more metrics of the answer; (ii) present, to the employee via the user device, a second question based upon the values associated with the one or more metrics of the answer; and/or (iii) present, to the employee via the user device, an explanation based upon the values associated with the one or more metrics of the answer. The chatbot in the system may implement a trained model. Training the model may include: (a) creating a first set of vectors associated with a first training data; (b) training the model in a first stage using the first set of vectors; (c) creating a second set of vectors associated with a second training data, wherein the second training data includes objects comprising questions, answers associated with the questions, values associated with metrics of the answers, and/or prompts for evaluating the answers; and/or (d) training the model in a second stage using the second set of vectors. Additional, alternate and/or fewer actions, steps, features and/or functionality may be included in an aspect and/or embodiments, including those described elsewhere herein.

In another aspect, a non-transitory computer-readable medium storing processor-executable instructions that, when executed by one or more processors, cause the one or more processors to: (1) receive, from a user device associated with an employee, an answer associated with a question; (2) generate, via a chatbot, values associated with one or more metrics of the answer; and/or (3) perform at least one of the following: (i) determine a skill level of the employee based upon the values associated with the one or more metrics of the answer; (ii) present, to the employee via the user device, a second question based upon the values associated with the one or more metrics of the answer; and/or (iii) present, to the employee via the user device, an explanation based upon the values associated with the one or more metrics of the answer. The chatbot may implement a trained model. Training the model may include: (a) creating a first set of vectors associated with a first training data; (b) training the model in a first stage using the first set of vectors; (c) creating a second set of vectors associated with a second training data, wherein the second training data includes objects comprising questions, answers associated with the questions, values associated with metrics of the answers, and/or prompts for evaluating the answers; and/or (d) training the model in a second stage using the second set of vectors. Additional, alternate and/or fewer actions, steps, features and/or functionality may be included in an aspect and/or embodiments, including those described elsewhere herein.

In one aspect, a computer-implemented method for career development may be provided. The computer-implemented method may be implemented via one or more local or remote processors, servers, transceivers, sensors, memory units, mobile devices, wearables, smart watches, smart contact lenses, smart glasses, augmented reality (AR) glasses, virtual reality (VR) headsets, mixed reality (MR) or extended reality glasses or headsets, voice bots or chatbots, ChatGPT or ChatGPT-based bots, and/or other electronic or electrical components, which may be in wired or wireless communication with one another. For example, in one instance, the computer-implemented method may include: (1) receiving, by one or more processors from a user device, an information element associated with a user; (2) generating, by the one or more processors via a chatbot, career development suggestions based upon the information element associated with the user; and/or (3) presenting, by the one or more processors to the user via the user device, the career development suggestions. The chatbot in the method may implement a trained model. Training the model may include: (a) creating a first set of vectors associated with first training data; (b) training the model in a first stage using the first set of vectors; (c) creating a second set of vectors associated with second training data, wherein the second training data comprising information elements associated with real and/or hypothetical users, prompts for generating career suggestions, and career suggestions associated with the documents and the prompts; and/or (d) training the model in a second stage using the second set of vectors. The method may include additional, less, or alternate functionality or actions, including those discussed elsewhere herein.

In another aspect, a computer system for career development may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT or ChatGPT-based bots, and/or other electronic or electrical components, which may be in wired or wireless communication with one another. For example, in one instance, the computer system may include: one or more processors, and a non-transitory memory storing one or more instructions, the instructions, when executed by the one or more processors, cause the one or more processors to: (1) receive, from a user device, an information element associated with a user; (2) generate, via a chatbot, career development suggestions based upon the information element associated with the user; and/or (3) present, to the user via the user device, the career development suggestions. The chatbot in the system may implement a trained model. Training the model may include: (a) creating a first set of vectors associated with first training data; (b) training the model in a first stage using the first set of vectors; (c) creating a second set of vectors associated with second training data, wherein the second training data comprising information elements associated with real and/or hypothetical users, prompts for generating career suggestions, and career suggestions associated with the documents and the prompts; and/or (d) training the model in a second stage using the second set of vectors. The computer system may include additional, less, or alternate functionality, including that discussed elsewhere herein.

In another aspect, a non-transitory computer-readable medium storing processor-executable instructions for career development may be provided. The instructions, when executed by one or more processors, cause the one or more processors to: (1) receive, from a user device, an information element associated with a user; (2) generate, via a chatbot, career development suggestions based upon the information element associated with the user; and/or (3) present, to the user via the user device, the career development suggestions. The chatbot may implement a trained model. Training the model may include: (a) creating a first set of vectors associated with first training data; (b) training the model in a first stage using the first set of vectors; (c) creating a second set of vectors associated with second training data, wherein the second training data comprising information elements associated with real and/or hypothetical users, prompts for generating career suggestions, and career suggestions associated with the documents and the prompts; and/or (d) training the model in a second stage using the second set of vectors. The instructions may direct additional, less, or alternate functionality, including that discussed elsewhere herein.

Additional, alternate and/or fewer actions, steps, features and/or functionality may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, methods and systems for training employees and/or providing career development suggestions using a chatbot, voice bot, ChatGPT bot, ChatGPT-based bot, or other bot.

The system for training employees may provide questions and/or explanations customized for an employee based upon the employee's performance on previous questions. The system for training employees may further provide skill level evaluations based upon the employee's performance on previous questions. The training process may be iterative and/or interactive. The training process may thus adapt to employee development resulting in a training process that is more efficient and effective, and/or otherwise incentivize the employee to perform better.

The system for providing career development suggestions may provide customized suggestions based upon a user's profile and/or other information. The suggestions may include job post and/or career development option recommendations that fit the user's education, skillset, and/or interest, etc. The suggestions may further include skill improvement recommendations based upon the user's skill weakness and/or the user's interest reflected by the user's profile. The recommendation process may be iterative and/or interactive. The recommendation process may thus be customized, effective, and comprehensive.

I. Exemplary Computing Environment

Figure 1:
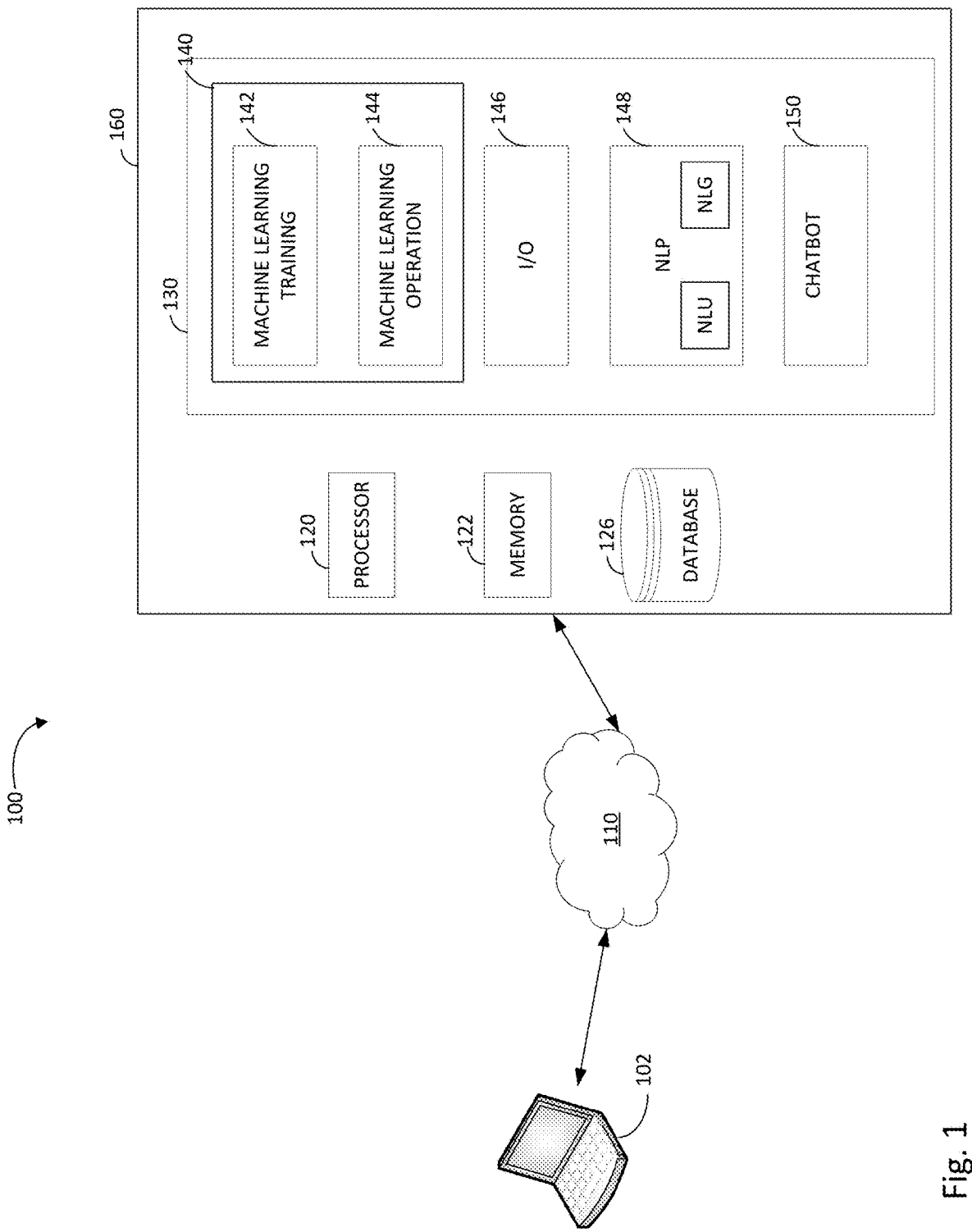
FIG. 1 depicts a block diagram of an exemplary computer environment in which methods and systems for training employees and/or career development are implemented according to one embodiment.

FIG. 1 depicts a block diagram of an exemplary computing environment 100 in which generating customized code may be performed, in accordance with various aspects discussed herein.

In the exemplary aspect of FIG. 1, the computing environment 100 includes a user device 102. In various aspects, the user device 102 comprises one or more computing devices, which may comprise multiple, redundant, or replicated client computing devices accessed by one or more users. The computing environment 100 may further include an electronic network 110 communicatively coupling other aspects of the computing environment 100.

The user device 102 may be any suitable device, including one or more computers, mobile devices, wearables, smart watches, smart contact lenses, smart glasses, augmented reality glasses, virtual reality headsets, mixed or extended reality glasses or headsets, and/or other electronic or electrical component. The user device 102 may include a memory and a processor for, respectively, storing and executing one or more modules. The memory may include one or more suitable storage media such as a magnetic storage device, a solid-state drive, random access memory (RAM), etc. The user device 102 may access services or other components of the computing environment 100 via the network 110.

In one aspect, one or more servers 160 may perform the functionalities as part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, an entity (e.g., a business) providing a chatbot to generate customized code may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business).

Alternatively, or in addition, aspects of the public cloud may be hosted on-premise at a location owned/controlled by an enterprise generating the customized code. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 3G, 4G, 5G, etc.). Generally, the network 110 enables bidirectional communication between the user device 102 and the servers 160. In one aspect, the network 110 may comprise a cellular base station, such as cell tower(s), communicating to the one or more components of the computing environment 100 via wired/wireless communications based upon any one or more of various mobile phone standards, including NMT, GSM, CDMA, UMMTS, LTE, 5G, 6G, or the like. Additionally or alternatively, the network 110 may comprise one or more routers, wireless switches, or other such wireless connection points communicating to the components of the computing environment 100 via wireless communications based upon any one or more of various wireless standards, including by non-limiting example, IEEE 802.11a/b/c/g (WIFI), Bluetooth, and/or or the like.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine-readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer-based product, application, or code (e.g., the model(s), such as ML models, or other computing instructions described herein) may be stored on a computer usable storage medium, or a tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data and be used to train and/or operate one or more ML models, chatbots, and/or voice bots.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, support vector machines and generative pre-trained transformers. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 160. For example, libraries may include the TensorFlow based library, the PyTorch library, a HuggingFace library, and/or the scikit-learn Python library.

In one embodiment, the ML module 140 may employ supervised learning, which involves identifying patterns in existing data to make predictions about subsequently received data. Specifically, the ML module is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with a de novo input that the model has not previously been provided, the model may output one or more predictions, classifications, etc., as described herein.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as the computer network 110 and/or the user device 102 (for rendering or visualizing) described herein. In one aspect, the servers 160 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. The I/O module 146 may facilitate I/O components (e.g., ports, capacitive or resistive touch sensitive input panels, keys, buttons, lights, LEDs), which may be directly accessible via, or attached to, servers 160 or may be indirectly accessible via or attached to the user device 102. According to an aspect, an administrator or operator may access the servers 160 via the user device 102 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module 148 may include NLU processing to understand the intended meaning of utterances, among other things. The NLP module 148 may include NLG which may provide text summarization, machine translation, and/or dialog where structured data is transformed into natural conversational language (i.e., unstructured) for output to the user.

In one aspect, the computing modules 130 may include one or more chatbots and/or voice bots 150 which may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques. For instance, the voice bot or chatbot 150 may be a ChatGPT bot, an InstructGPT bot, a Codex bot, or a Google Bard bot. The voice bot or chatbot 150 may employ supervised or unsupervised ML techniques, which may be followed by, and/or used in conjunction with, reinforced or reinforcement learning techniques. The voice bot or chatbot 150 may employ the techniques utilized for ChatGPT, ChatGPT bot, InstructGPT bot, Codex bot, or Google Bard bot.

Noted above, in some embodiments, a chatbot 150 or other computing device may be configured to implement ML, such that server 160 "learns" to analyze, organize, and/or process data without being explicitly programmed. ML may be implemented through ML methods and algorithms. In one exemplary embodiment, the ML module 140 may be configured to implement ML methods and algorithms.

In operation, ML training module 142 may access database 126 or any other data source for training data suitable to generate one or more ML models appropriate to receive and/or process the request for customized insurance policy, e.g., as part of an "ML chatbot." The training data may be sample data with assigned relevant and comprehensive labels (classes or tags) used to fit the parameters (weights) of an ML model with the goal of training it by example. In one aspect, once an appropriate ML model is trained and validated to provide accurate predictions and/or responses, the trained ML model may be loaded into MLOM 144 at runtime, may process the user inputs and/or utterances, may generate as an output conversational dialog, and may generated customized code implementing a customized insurance policy.

While various embodiments, examples, and/or aspects disclosed herein may include training and generating one or more chatbots 150 for the server 160 to load at runtime, it is also contemplated that one or more appropriately trained ML chatbots 150 may already exist (e.g., in database 126) such that the server 160 may load an existing trained chatbot 150 at runtime. It is further contemplated that the server 160 may retrain, update and/or otherwise alter an existing chatbot 150 before loading the model at runtime.

Although the computing environment 100 is shown to include one user device 102, one server 160, and one network 110, it should be understood that different numbers of user devices 102, networks 110, and/or servers 160 may be utilized. In one example, the computing environment 100 may include a plurality of servers 160 and hundreds or thousands of user devices 102, all of which may be interconnected via the network 110. Furthermore, the database storage or processing performed by the one or more servers 160 may be distributed among a plurality of servers 160 in an arrangement known as "cloud computing." This configuration may provide various advantages, such as enabling near real-time uploads and downloads of information as well as periodic uploads and downloads of information.

The computing environment 100 may include additional, fewer, and/or alternate components, and may be configured to perform additional, fewer, or alternate actions, including components/actions described herein. Although the computing environment 100 is shown in FIG. 1 as including one instance of various components such as user device 102, server 160, and network 110, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 160 and user device 102 may be connected via a direct communication link (not shown in FIG. 1) instead of, or in addition to, via network 110.

II. Exemplary Training of the ML Chatbot Model

An enterprise may be able to use programmable chatbots, such as the chatbot 150 and/or an ML chatbot (e.g., ChatGPT), to provide tailored, conversational-like customer service relevant to a line of business. The chatbot may be capable of understanding customer requests, providing relevant information, escalating issues, any of which may assist and/or replace the need for customer service assets of an enterprise. Additionally, the chatbot may generate data from customer interactions which the enterprise may use to personalize future support and/or improve the chatbot's functionality, e.g., when retraining and/or fine-tuning the chatbot.

In certain embodiments, the machine learning chatbot may be configured to utilize artificial intelligence and/or machine learning techniques. For instance, the machine learning chatbot or voice bot may be a ChatGPT chatbot. The machine learning chatbot may employ supervised or unsupervised machine learning techniques, which may be followed by, and/or used in conjunction with, reinforced or reinforcement learning techniques. The machine learning chatbot may employ the techniques utilized for ChatGPT. The machine learning chatbot may be configured to generate verbal, audible, visual, graphic, text, or textual output for either human or other bot/machine consumption or dialogue.

The ML chatbot may provide advance features as compared to a non-ML chatbot. For example, the ML chatbot may include and/or derive functionality from a large language model (LLM). The ML chatbot may be trained on a server, such as server 160, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user prompts and/or utterances, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 160) that may be required for immediate use and may keep track of the current state of the conversation and/or to understand the user's latest input in order to generate an appropriate response. Long-term memory may include persistent storage of information (e.g., on database 126 of the server 160) which may be accessed over an extended period of time. The long-term memory may be used by the ML chatbot to store information about the user (e.g., preferences, chat history, etc.) and may be useful for improving an overall user experience by enabling the ML chatbot to personalize and/or provide more informed responses.

The system and methods to generate and/or train an ML chatbot model (e.g., via the ML module 140 of the server 160) which may be used the an ML chatbot, may consists of three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

In some embodiments, the language model is pre-trained by a set of training data. The set of training data may include documents. The set of training data may be associated with a set of vectors. Creating the set of vectors may include (1) extracting text from documents, (2) splitting the text into semantic clusters, and (3) encoding the semantic clusters as the set of vectors. The semantic clusters may be one or more words, a portion of a word, or a character. A distance between the vectors (e.g., a cosine distance, a Euclidean distance) may depend on a relevance between the semantic clusters corresponding to the vectors.

In some embodiments, the server 160 or an external computing device may encode the vectors using a trained machine learning model (e.g., via the ML module 140). The trained machine learning model may include a plurality of parameters. When training the machine learning model, the plurality of parameters may be updated iteratively. In other embodiments, the server 160 may encode the vectors using existing encoding tables and/or libraries.

A. Supervised Fine-Tuning ML Model

Figure 2:
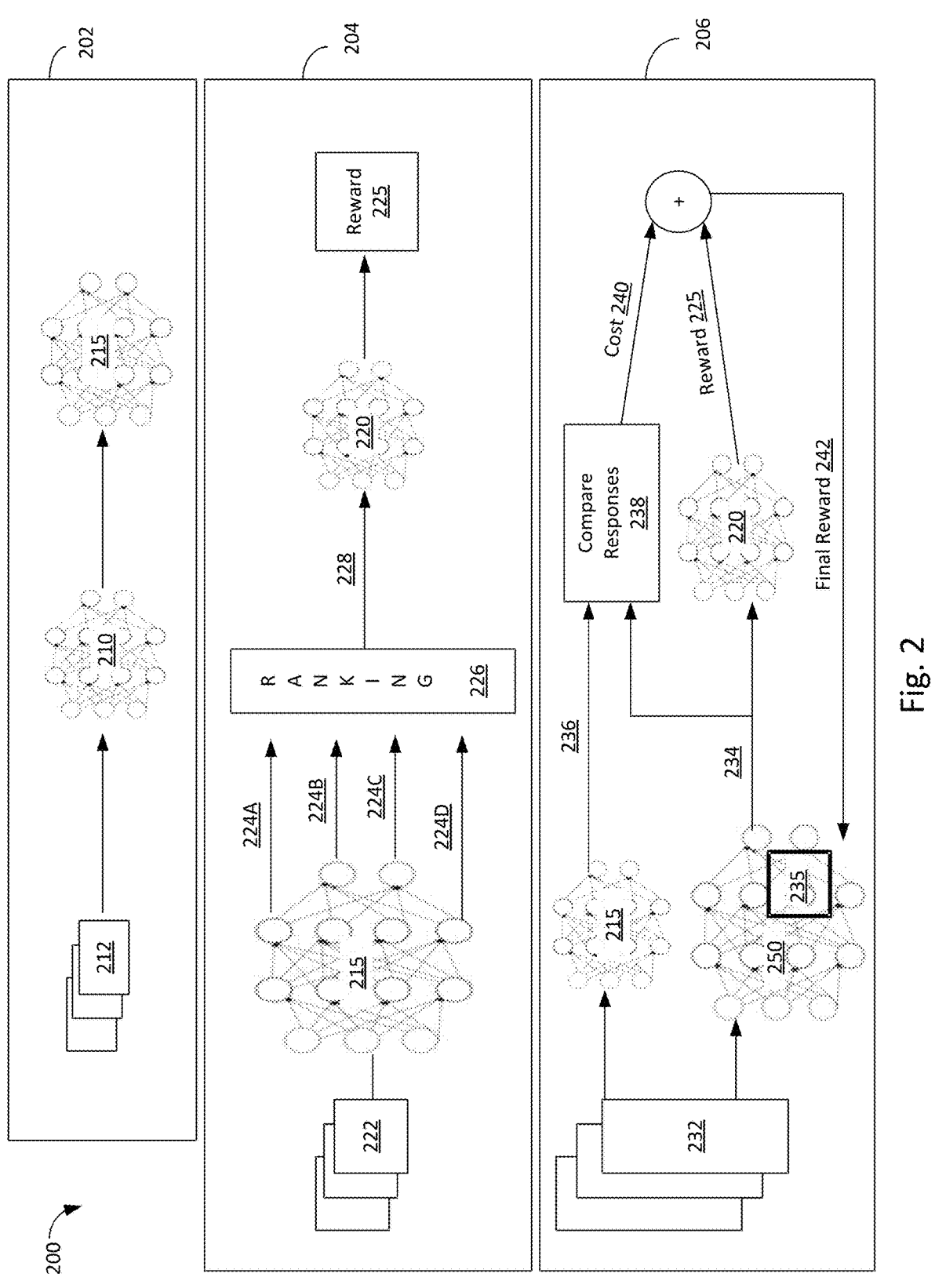
FIG. 2 depicts a combined block and logic diagram in which exemplary computer-implemented methods and systems for training an ML chatbot or an AI model are implemented according to one embodiment.

FIG. 2 depicts a combined block and logic diagram 200 for training an ML chatbot model, in which the techniques described herein may be implemented, according to some embodiments. Some of the blocks in FIG. 2 may represent hardware and/or software components, other blocks may represent data structures or memory storing these data structures, registers, or state variables (e.g., 212), and other blocks may represent output data (e.g., 225). Input and/or output signals may be represented by arrows labeled with corresponding signal names and/or other identifiers. The methods and systems may include one or more servers 202, 204, 206, such as the server 160 or an external computing device.

In one aspect, the server 202 may fine-tune a pretrained language model 210. The pretrained language model 210 may be obtained by the server 202 and be stored in a memory, such as memory 122 and/or database 126. The pretrained language model 210 may be loaded into an ML training module, such as MLTM 142, by the server 202 for retraining/fine-tuning. A supervised training dataset 212 may be used to fine-tune the pretrained language model 210 wherein each data input prompt to the pretrained language model 210 may have a known output response for the pretrained language model 210 to learn from. The supervised training dataset 212 may be stored in a memory of the server 202, e.g., the memory 122 or the database 126. In one aspect, the data labelers may create the supervised training dataset 212 prompts and appropriate responses. The pretrained language model 210 may be fine-tuned using the supervised training dataset 212 resulting in the SFT ML model 215 which may provide appropriate responses to user prompts once trained. The trained SFT ML model 215 may be stored in a memory of the server 202, e.g., memory 122 and/or database 126.

In some embodiments, the server 202 may fine-tune the pretrained language model 210 using a set of training data. In some instances, the set of training data may include objects comprising questions, answers associated with the questions, values associated with metrics of the answers, and/or prompts for evaluating the answers. In some instances, the set of training data may include (1) skill level evaluations associated with the values associated with the metrics of the answers, (2) further questions associated with the values associated with the metrics of the answers, and/or (3) explanations associated with the values associated with the metrics of the answers.

In some instances, the set of training data may include information elements associated with real and/or hypothetical users, prompts for generating career suggestions, and career suggestions associated with the documents and the prompts. In some instances, the set of training data may further include career options associated with the information elements of the real and/or hypothetical users, skill improvement recommendations associated with the information elements of the real and/or hypothetical users, and search parameters associated with the information elements of the real and/or hypothetical users compliant for use by databases including online courses and/or programs.

B. Training the Reward Model

In one aspect, training the ML chatbot model 250 may include the server 204 training a reward model 220 to provide as an output a scaler value/reward 225. The reward model 220 may be required to leverage Reinforcement Learning with Human Feedback (RLHF) in which a model (e.g., ML chatbot model 250) learns to produce outputs which maximize its reward 225, and in doing so may provide responses which are better aligned to user prompts.

Training the reward model 220 may include the server 204 providing a single prompt 222 to the SFT ML model 215 as an input. The input prompt 222 may be provided via an input device (e.g., a keyboard) via the I/O module of the server, such as I/O module 146. The prompt 222 may be previously unknown to the SFT ML model 215, e.g., the labelers may generate new prompt data, the prompt 222 may include testing data stored on database 126, and/or any other suitable prompt data. The SFT ML model 215 may generate multiple, different output responses 224A, 224B, 224C, 224D to the single prompt 222. The server 204 may output the responses 224A, 224B, 224C, 224D via an I/O module (e.g., I/O module 146) to a user interface device, such as a display (e.g., as text responses), a speaker (e.g., as audio/voice responses), and/or any other suitable manner of output of the responses 224A, 224B, 224C, 224D for review by the data labelers.

The data labelers may provide feedback via the server 204 on the responses 224A. 224B, 224C, 224D when ranking 226 them from best to worst based upon the prompt-response pairs. The data labelers may rank 226 the responses 224A, 224B, 224C, 224D by labeling the associated data. The ranked prompt-response pairs 228 may be used to train the reward model 220. In one aspect, the server 204 may load the reward model 220 via the ML module (e.g., the ML module 140) and train the reward model 220 using the ranked response pairs 228 as input. The reward model 220 may provide as an output the scalar reward 225.

In one aspect, the scalar reward 225 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 220 may generate a winning reward. Inputting a "losing" prompt-response pair data to the same reward model 220 may generate a losing reward. The reward model 220 and/or scalar reward 225 may be updated based upon labelers ranking 226 additional prompt-response pairs generated in response to additional prompts 222.

In one example, a data labeler may provide to the SFT ML model 215 as an input prompt 222. "Describe the sky." The input may be provided by the labeler via the user device 102 over network 110 to the server 204 running a chatbot application utilizing the SFT ML model 215. The SFT ML model 215 may provide as output responses to the labeler via the user device 102: (i) "the sky is above" 224A; (ii) "the sky includes the atmosphere and may be considered a place between the ground and outer space" 224B; and (iii) "the sky is heavenly" 224C. The data labeler may rank 226, via labeling the prompt-response pairs, prompt-response pair 222/224B as the most preferred answer; prompt-response pair 222/224A as a less preferred answer; and prompt-response 222/224C as the least preferred answer. The labeler may rank 226 the prompt-response pair data in any suitable manner. The ranked prompt-response pairs 228 may be provided to the reward model 220 to generate the scalar reward 225.

While the reward model 220 may provide the scalar reward 225 as an output, the reward model 220 may not generate a response (e.g., text). Rather, the scalar reward 225 may be used by a version of the SFT ML model 215 to generate more accurate responses to prompts, i.e., the SFT model 215 may generate the response such as text to the prompt, and the reward model 220 may receive the response to generate a scalar reward 225 of how well humans perceive it. Reinforcement learning may optimize the SFT model 215 with respect to the reward model 220 which may realize the configured ML chatbot model 250.

C. RLHF to Train the ML Chatbot Model

In one aspect, the server 206 may train the ML chatbot model 250 (e.g., via the ML module 140) to generate a response 234 to a random, new and/or previously unknown user prompt 232. To generate the response 234, the ML chatbot model 250 may use a policy 235 (e.g., algorithm) which it learns during training of the reward model 220, and in doing so may advance from the SFT model 215 to the ML chatbot model 250. The policy 235 may represent a strategy that the ML chatbot model 250 learns to maximize its reward 225. As discussed herein. based upon prompt-response pairs, a human labeler may continuously provide feedback to assist in determining how well the ML chatbot's 250 responses match expected responses to determine rewards 225. The rewards 225 may feed back into the ML chatbot model 250 to evolve the policy 235. Thus, the policy 235 may adjust the parameters of the ML chatbot model 250 based upon the rewards 225 it receives for generating good responses. The policy 235 may update as the ML chatbot model 250 provides responses 234 to additional prompts 232.

In one aspect, the response 234 of the ML chatbot model 250 using the policy 235 based upon the reward 225 may be compared using a cost function 238 to the SFT ML model 215 (which may not use a policy) response 236 of the same prompt 232. The cost function 238 may be trained in a similar manner and/or contemporaneous with the reward model 220. The server 206 may compute a cost 240 based upon the cost function 238 of the responses 234, 236. The cost 240 may reduce the distance between the responses 234, 236, i.e., a statistical distance measuring how one probability distribution is different from a second, in one aspect the response 234 of the ML chatbot model 250 versus the response 236 of the SFT model 215. Using the cost 240 to reduce the distance between the responses 234, 236 may avoid a server over-optimizing the reward model 220 and deviating too drastically from the human-intended/preferred response. Without the cost 240, the ML chatbot model 250 optimizations may result in generating responses 234 which are unreasonable but may still result in the reward model 220 outputting a high reward 225.

In one aspect, the responses 234 of the ML chatbot model 250 using the current policy 235 may be passed by the server 206 to the rewards model 220, which may return the scalar reward 225. The ML chatbot model 250 response 234 may be compared via the cost function 238 to the SFT ML model 215 response 236 by the server 206 to compute the cost 240. The server 206 may generate a final reward 242 which may include the scalar reward 225 offset and/or restricted by the cost 240. The final reward 242 may be provided by the server 206 to the ML chatbot model 250 and may update the policy 235, which in turn may improve the functionality of the ML chatbot model 250.

To optimize the ML chatbot 250 over time, RLHF via the human labeler feedback may continue ranking 226 responses of the ML chatbot model 250 versus outputs of earlier/other versions of the SFT ML model 215, i.e., providing positive or negative rewards 225. The RLHF may allow the servers (e.g., servers 204, 206) to continue iteratively updating the reward model 220 and/or the policy 235. As a result, the ML chatbot model 250 may be retrained and/or fine-tuned based upon the human feedback via the RLHF process, and throughout continuing conversations may become increasingly efficient.

Although multiple servers 202, 204, 206 are depicted in the exemplary block and logic diagram 200, each providing one of the three steps of the overall ML chatbot model 250 training, fewer and/or additional servers may be utilized and/or may provide the one or more steps of the ML chatbot model 250 training. In one aspect, one server may provide the entire ML chatbot model 250 training.

III. Employee Training

A. Exemplary Graphical User Interface (GUI)

FIGS. 3A-3D depict an exemplary GUI 300 of an application implementing a method disclosed herein for employee training purposes, according to one embodiment. The GUI 300 may include a chat interface 320 via which the GUI presents questions to a user and/or obtains responses from the user. The application may be run on a user device 102 communicating with a server 160 via a network 110.

Figure 3A:
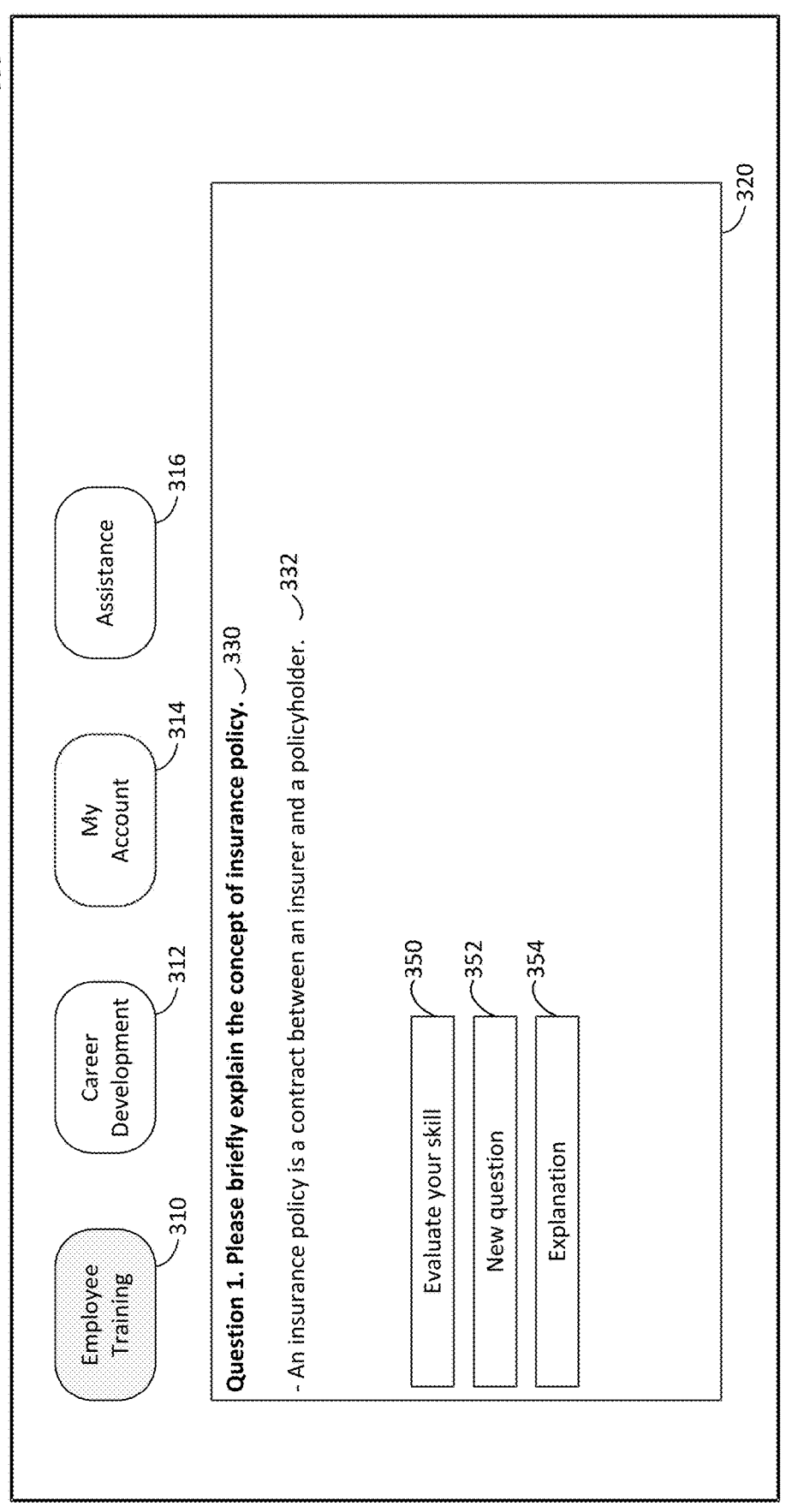
FIGS. 3A-3D depict exemplary displays of an application implementing a method for training employees according to one embodiment.

Starting with FIG. 3A, the GUI 300 may be presented upon starting the application. As illustrated, the user device 102 may display selectable elements "Employee Training" 310, "Career Development" 312, "My Account" 314, and "Assistance" 316. In response to the user selecting element 310, the user device 102 may present a first question 330 in the chat interface 320 for training purposes. The user may respond with an answer 332 via text (e.g., by typing) and/or audio (e.g., by speaking). In scenarios where the user responds by typing, the chat interface 320 may include a text entry element. In scenarios where the user responds by speaking, the user device 102 may transcribe the audio data and enter the transcribed audio into the chat interface 320.

In some embodiments, after the user inputs an answer to the first question, the user device 102 may display three selectable elements "Evaluate your skill" 350, "New question" 352, and "Explanation" 354. The application may evaluate the user's skill, present a second question, or provide an explanation to the first question in response to detecting a selection of the corresponding element 350, 352, 354. In other embodiments, the application may perform at least one of the aforementioned actions without a user selection.

Figure 3B:
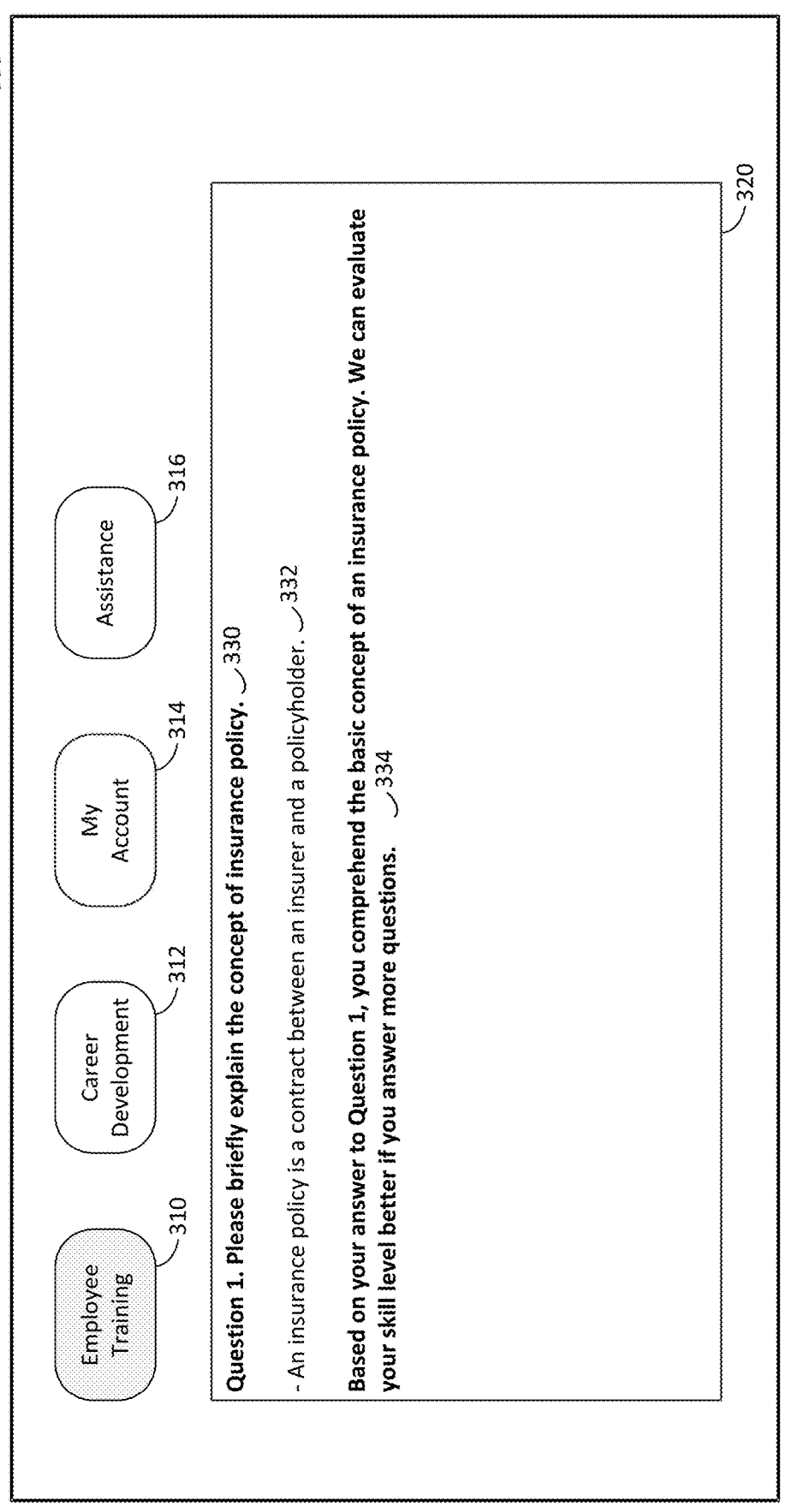

Turning to FIG. 3B, illustrated is an exemplary view of the GUI 300 presented, for example, in response to the user selecting the element 350. Accordingly, the application may evaluate the user's skill level based upon the answer 332. More particularly, the application may input the answer 332 into a ML chatbot model (e.g., the ML chatbot models 150, 250) to evaluate the answer 332. In the illustrated embodiment, ML chatbot model determined that the answer 332 is insufficient for evaluating the user's skill level. Accordingly, the ML chatbot model may output a response 334 in the chat interface 320 requesting that the user answers more questions to obtain a more accurate skill evaluation.

Figure 3C:
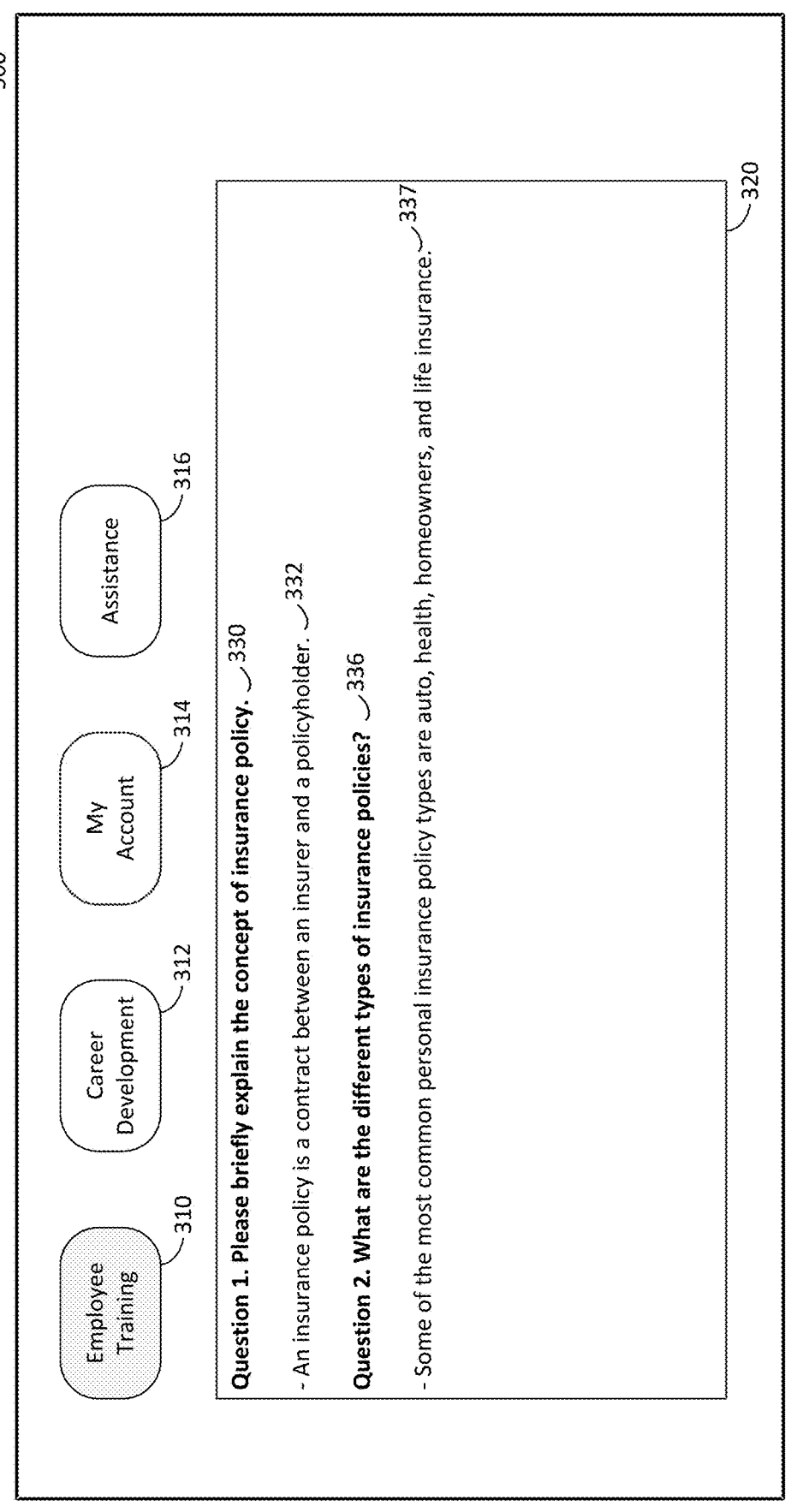

Turning to FIG. 3C, illustrated is an exemplary view of the GUI 300 presented, for example, after the user selected the element 352. As illustrated, in response to the user selection of the element 352, the application may present a second question 336 via the chat interface 320. The second question may be a new question or a follow-up question with respect to the first question. Accordingly, the user may provide an answer 337 in response to the second question 336. In some embodiments, the chat interface 320 may also present the elements 350, 352, 354 of FIG. 3A.

Figure 3D:
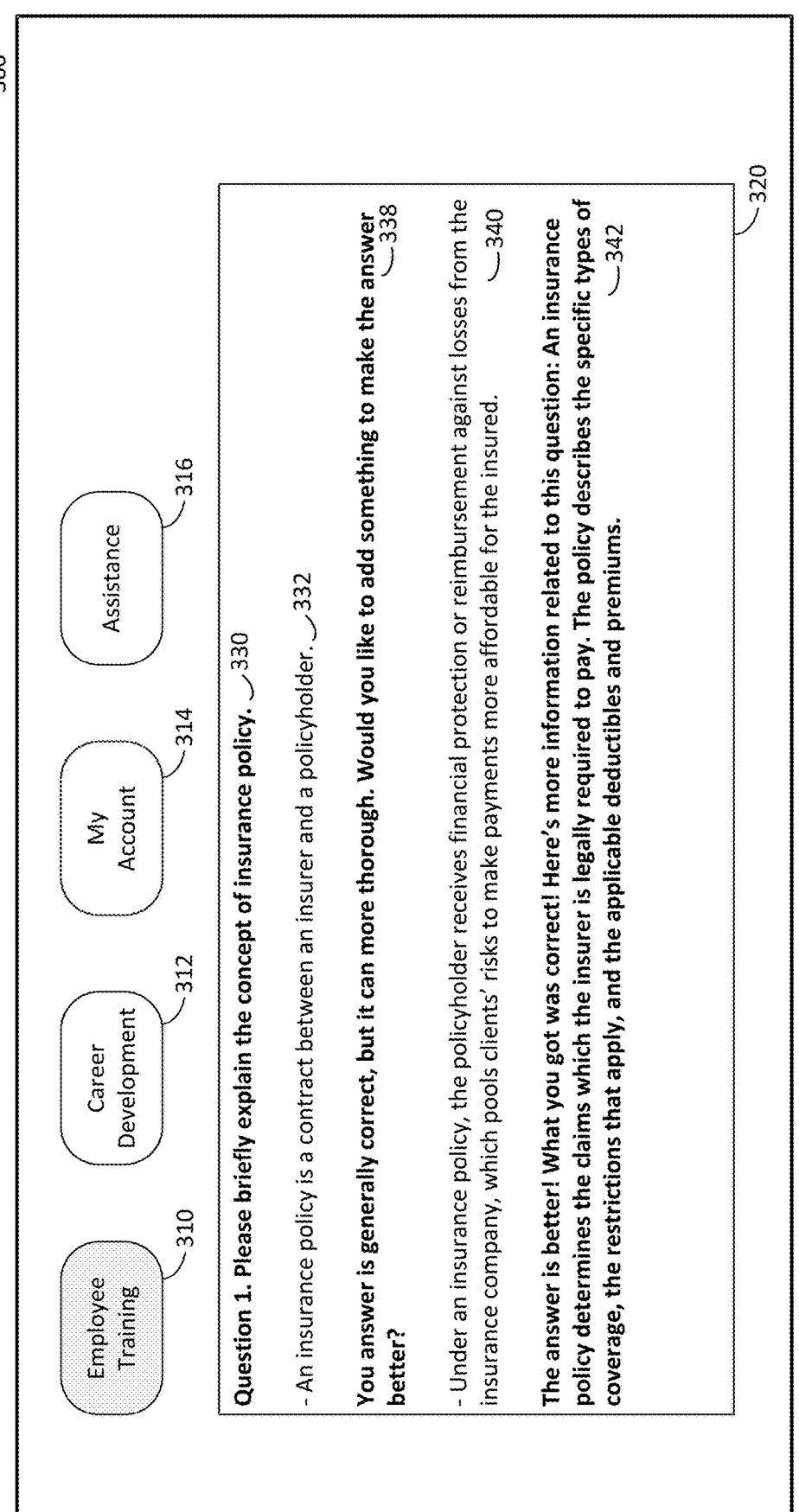

Turning to FIG. 3D, illustrated is an exemplary view of the GUI 300 presented, for example, after the user selected the element 354. As illustrated, in response to the user selection of the element 354, the application may provide an explanation 338 of the first question 330. In some embodiments, the explanation 338 may include an evaluation of the user's answer. In some embodiments, the explanation 338 may invite the user to supplement the answer 332 and/or change the answer 332. The application may provide a further explanation 342 based upon the user's response 340.

Although not depicted in the figures, the user device 102 may display all or some of the selectable elements 350-354 whenever that is appropriate. For example, the user device 102 may display selectable elements "New question" 352 and "Explanation" 354 after the application provides the skill level evaluation 334. In another example, the user device 102 may display selectable elements 350-354 after the user responds to the second question 336. In yet another example, the user device 102 may display selectable elements "Evaluate your skill" 350 and "New question" 352 after the application provides the explanation 342.

In some embodiments, the user may interact with selectable element 314 to view information associated with the user's account. Such information may include the user's past answers to questions, explanations to the questions, and/or the user's past skill level evaluations.

In some embodiments, the user may interact with selectable element 316 to seek assistance from human agents and/or user support chatbots.

B. Exemplary Computer-Implemented Method

Figure 4:
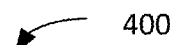
FIG. 4 depicts a flow diagram of an exemplary computer-implemented method for training employees according to one embodiment.

FIG. 4 depicts a flow diagram of an exemplary computer-implemented method 400 for training employees according to one embodiment. The method 400 may be performed by one or more processors of a server (such as the server 160 of FIG. 1).

The method 400 may begin when a user inputs an answer to a question via a user device (such as the user device 102 of FIG. 1) running an application disclosed herein. At block 410, the server may receive the answer from the user device (such as the answer 332 in FIG. 3A).

At block 412, the server may generate values associated with one or more metrics of the answer. In some embodiment, the server may generate the values by sending the answer to a chatbot (such as the chatbots 150, 250) and receiving the values from the chatbot. In some instances, the chatbot may be trained with answers to questions and values of metrics of the answers. In other instances, the chatbot may be trained with sample answers, hypothetical and/or real answers from users, and metric values of the answers associated with differences between the sample answers and the answers from users.

In other embodiments, the server may generate the values associated with one or more metrics of the answer by analyzing the answer. In some instances, the server may compare the answer with a sample answer via an NLP module using natural language processing techniques. For example, the server may extract a first set of keywords from the answer received from the user device a second set of keywords from the sample answer via the NLP module. The server 160 may then determine a difference between first and second sets of keywords, e.g., by determining a semantic distance between the two sets of keywords. The server 160 may then determine the values based upon the difference. One will appreciate that a keyword disclosed herein may be a word, a word cluster, an n-gram, or other unit of NLP tokenization.

In some embodiments, the one or more metrics includes an accuracy rate of the answer, a thoroughness of the answer, a time of completing the answer, an efficiency of finding references for the answer, and/or a sentiment of the answer. In the embodiments where the server generates the values of metrics based upon keywords comparison, the server may determine that an answer has a low accuracy metric value based upon a keyword from the user's answer being opposite (and/or at a semantic distance above a threshold) to a keyword from the sample answer. Likewise, the server may determine that the answer has a low thoroughness metric value in view of certain keywords from the sample answer being missing from the keywords from the user's answer.

In some embodiments, the question may include a plurality of sub-questions. Accordingly, the user's answer or a sample answer may include a plurality of sub-answers. In another example, the question may involve multiple issues. A thorough answer to the question may include multiple sub-answers addressing the each of the multiple issues. In this example, the values associated with the metrics of the answer may correspond to each of the plurality of sub-answers. For example, the user's answer may have a high accuracy metric value associated with a first sub-question and/or issue, but a low accuracy metric value associated with a second sub-question and/or issue.

At block 414, the server may perform at least one of the following actions: determining a skill level of the user based the user's answer, presenting a second question to the user, or presenting an explanation of the first question to user. In some embodiments, the server may determine an action to perform based upon the user's instructions as described herein above with respect to FIG. 3A. In other embodiments, the server may determine an action to perform based upon a set of rules. For example, when the user has not answered a sufficient number of questions, the server may refrain from evaluating the user's skill level. In another example, if the user's answer to the first question has high metric values (e.g., a high accuracy metric value), the server may refrain from providing an explanation. In yet another example, if the user's answer to the first question has low metric values (e.g., a low accuracy metric value), the server may provide an explanation for the first question before presenting a second question.

At block 416, the server may determine the user's skill level based upon the values associated with the one or more metrics of the answer (such as the evaluation in the response 334). In some embodiments, the server may determine the user's skill level based upon metric values of a plurality of the user's answers to a plurality of questions.

In some embodiments, the server may determine the user's skill level by sending the metrics values of one or more answers and the corresponding questions to the chatbot 150 to receive a skill level evaluation. To this end, the chatbot may be trained with metric values of answers, questions corresponding to the answers, and skill levels associated with the metric values of the answers and the corresponding questions.

In other embodiments, the server may determine the user's skill level by a trained machine learning model (e.g., via the ML module 140) separate from the chatbot. In some instances, the trained machine learning model may take the metrics values of one or more answers as an input and generate a skill level evaluation as output. The trained machine learning model may be any appropriate model described herein above.

In other instances, the trained machine learning model may additionally accept the corresponding questions as input. For example, each of the questions may be labeled with one or more keywords that represent a topic to which the question relates. The labelling may be performed by a human labeler or by the server (e.g., via the NLP module 148 or the ML module 140). The trained machine learning model may then generate a skill level evaluation based upon the metric values of the answers and the keywords of the corresponding questions. For example, if the metric values of the answers corresponding questions associated with a first keyword are high, but the metric values of the answers corresponding questions associated with a second keyword are low, the trained machine learning model may generate a skill evaluation that the user has a good skill level associated with a first topic associated with the first keyword, but needs improvement in a second topic associated with the second keyword.

At block 418, the server may present a second question (such as the question 336) to the user via the user device. The server may generate the second question based upon the values associated with the one or more metrics of the answer to the question (the "first question"). In some embodiments, the server may generate the second question based upon metric values of a plurality of the user's answers to a plurality of questions.

In some embodiments, the server may generate the second question by sending the metric values of the answer and the first question to the chatbot to receive the second question. In these embodiments, the chatbot may be trained with metric values of answers, questions corresponding to the answers, and further questions associated with the metric values of the answers and the corresponding questions.

In other embodiments, the server may generate the second question by selecting a question from a plurality of questions (e.g., questions stored in the database 126) based upon the metric values of the answer. For example, if the metric values of the answer show the user answered the first question well, the server may choose a harder question in the same topic as the first question, or a question in a different topic. Conversely, if the metric values of the answer show the user may need improvement in a particular topic associated the first question, the server may select a second question in the particular topic with a lower or similar difficulty level with the first question.

At block 420, the server may present an explanation (such as the explanation 342) to the user via the user device. The server may generate the explanation based upon the values associated with the one or more metrics of the answer to the question.

In some embodiments, the server may generate the explanation by inputting the metric values of the answer and the question to the chatbot to receive the explanation. In these embodiments, the chatbot may be trained with metric values of answers, questions corresponding to the answers, and explanations associated with the metric values of the answers and the corresponding questions. In some instances, a detail level of the explanation generated by the chatbot may be based upon the metric values of the answer. In some instances, a detail level of a particular aspect of the explanation may be based upon the metric values of the answer associated with the particular aspect.

In other embodiments, the server may generate the explanation by selecting an explanation from a plurality of sample explanations (e.g., sample explanations stored in the database 126) based upon the metric values of the answer. For example, if the metric values of the answer show the user answered the question well, the server may select a brief sample explanation.

In yet other embodiments, the server may generate the explanation by selecting explanation snippets based upon the metric values of the answer and combine the selected snippets into the explanation. For example, if the metric values of the answer show the user answered a first sub-question of the question well, but did not address a second sub-question of the question, the server 160 may select a brief explanation snippet corresponding to the first sub-question (e.g., one sentence explaining the first sub-question), and a thorough explanation snippet corresponding to the second sub-question (e.g., one or more paragraphs explaining the second sub-question). In some instances, if the metric values of the answer show the user's answer may need improvement, the server may prompt to the user to provide additional answers, instead of providing an explanation immediately (such as the response 338 in FIG. 3D).

It should be understood that not all blocks of the exemplary flow diagram 400 are required to be performed. It should be also understood that additional and/or alternative steps may be performed.

IV. Career Development

A. Exemplary Graphical User Interface (GUI)

FIGS. 5A-5D depict an exemplary GUI 500 of an application implementing a method disclosed herein for career development purposes, according to one embodiment. The GUI 500 may include a chat interface 520 via which the GUI presents questions to a user and/or obtains responses from the user. The application may be run on a user device 102 communicating with a server 160 via a network 110.

Figure 5A:
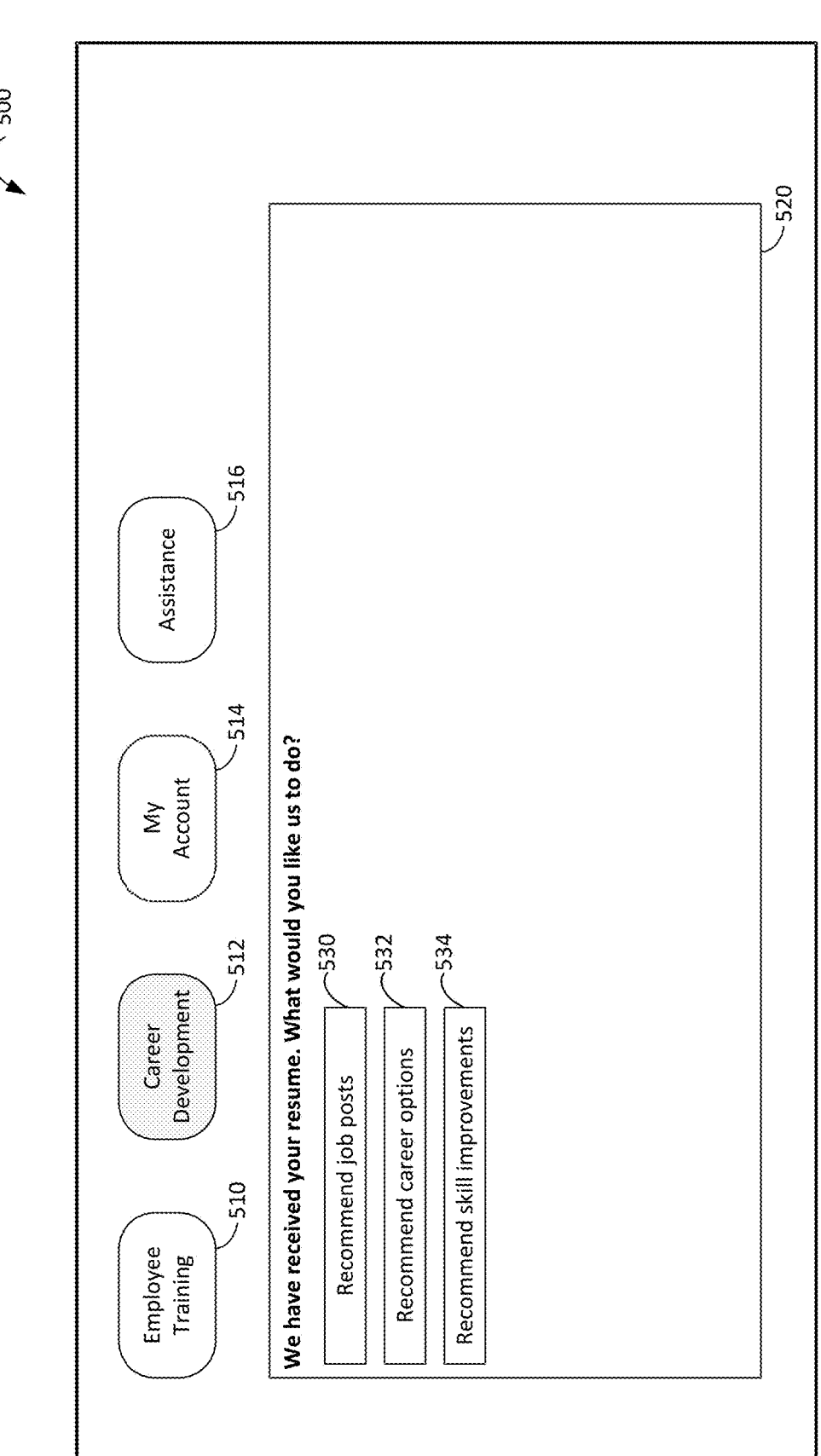
FIG. 5A-5D depict exemplary displays of an application implementing a method for career development according to one embodiment.

Starting with FIG. 5A, the GUI 500 may be presented upon starting the application. As illustrated, the user device 102 may display selectable elements "Employee Training" 510, "Career Development" 512, "My Account" 514, and "Assistance" 516, similar to the selectable elements 310-316 in FIG. 3A, respectively. In response to the user selecting element 512, the user device 102 may retrieve or request an information element associated with the user. The user may input the information element by uploading files, typing and/or speaking. In scenarios where the user inputs the information element by typing, the chat interface 520 may include a text entry element. In scenarios where the user inputs the information element by speaking, the user device 102 may transcribe the audio data and enter the transcribed audio into the chat interface 520.

In some embodiments, after the use inputs the information element, the user device may display three selectable elements "Recommend job posts" 530, "Recommend career options" 532, and "Recommend skill improvements" 534. The server 160 may recommend job posts, recommend career options, or recommend skill improvements in response to detecting a selection of the corresponding element 530, 532, 534. In other embodiments, the application may perform at least one of the aforementioned actions without a user selection.

Figure 5B:
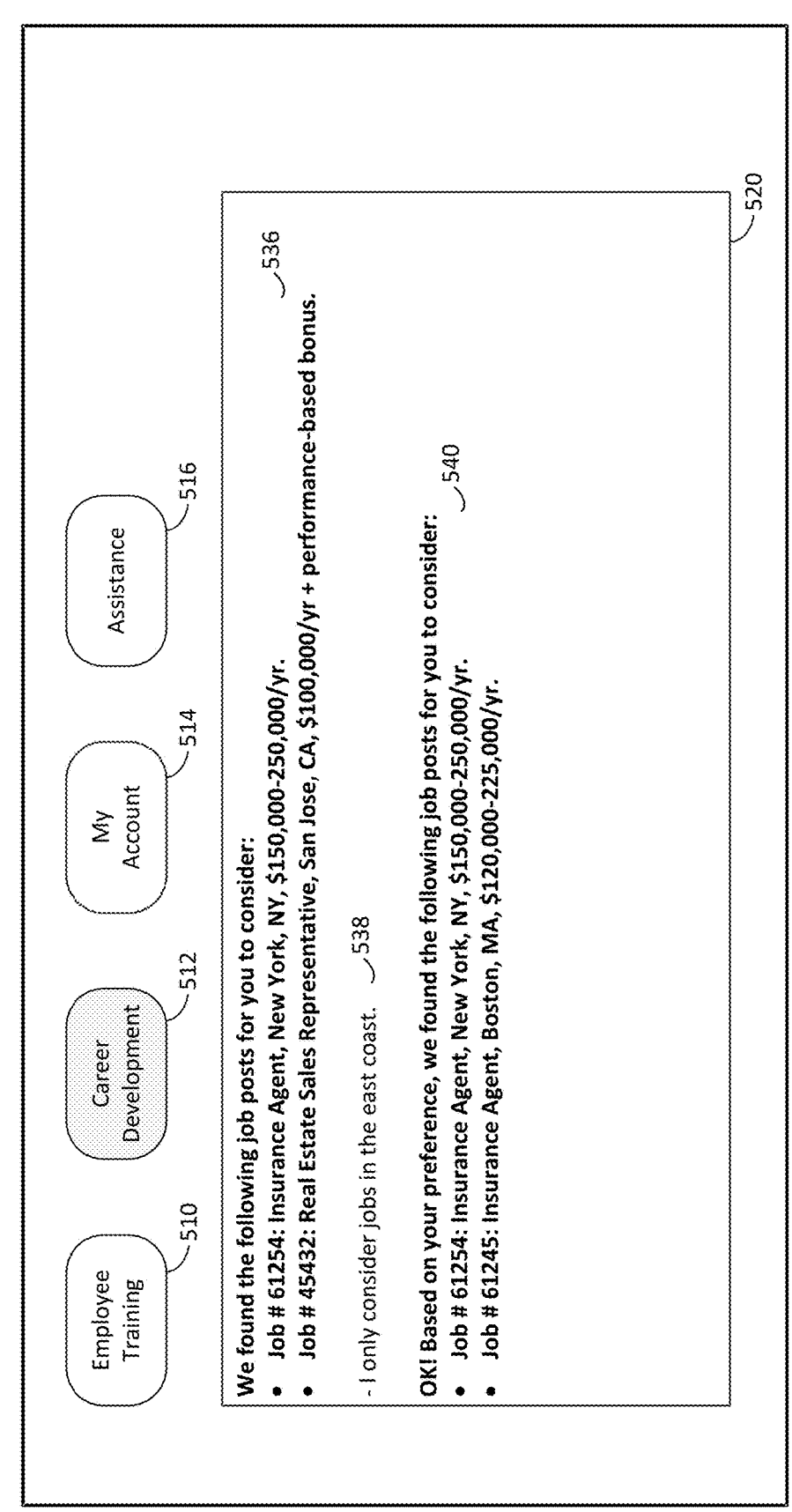

Turning to FIG. 5B, illustrated is an exemplary view of the GUI 500 presented, for example, after the user selected the element 530. As illustrated, in response to the user selection of the element 530, the application may present job posts 536 via the chat interface 520. The user may request that the recommended job posts are refined via a response 538. The application may provide updated the recommendations 540 based upon the user's instructions in the response 538.

Figure 5C:
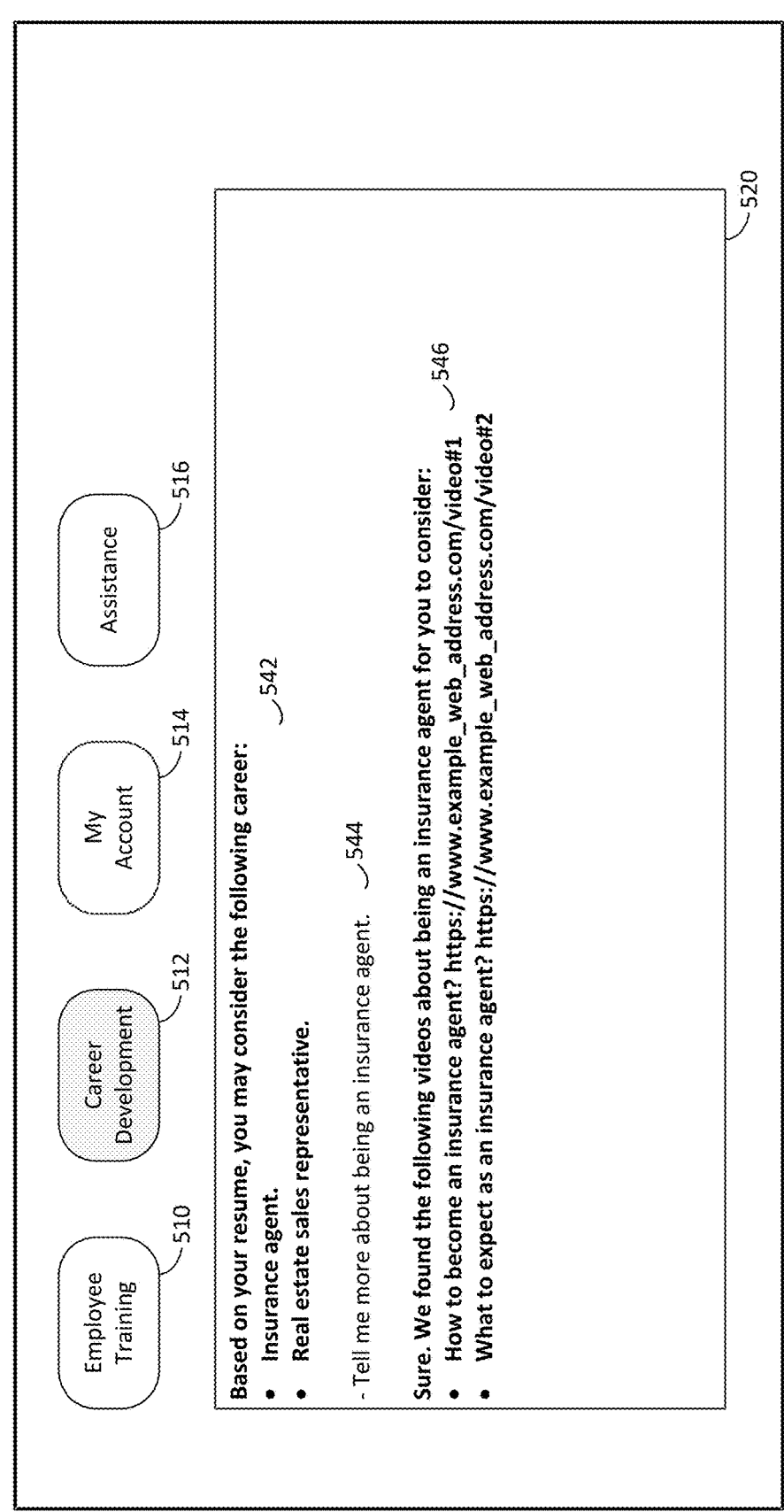

Turning to FIG. 5C, illustrated is an exemplary view of the GUI 500 presented, for example, after the user selected the element 532. As illustrated, in response to the user selection of the element 532, the application may present career options 542 via the chat interface 520. In the illustrated scenario, the user may then request more information about the career options via a response 544. The application may respond in texts or provide relevant materials (such as the videos) in a response 546.

Figure 5D:
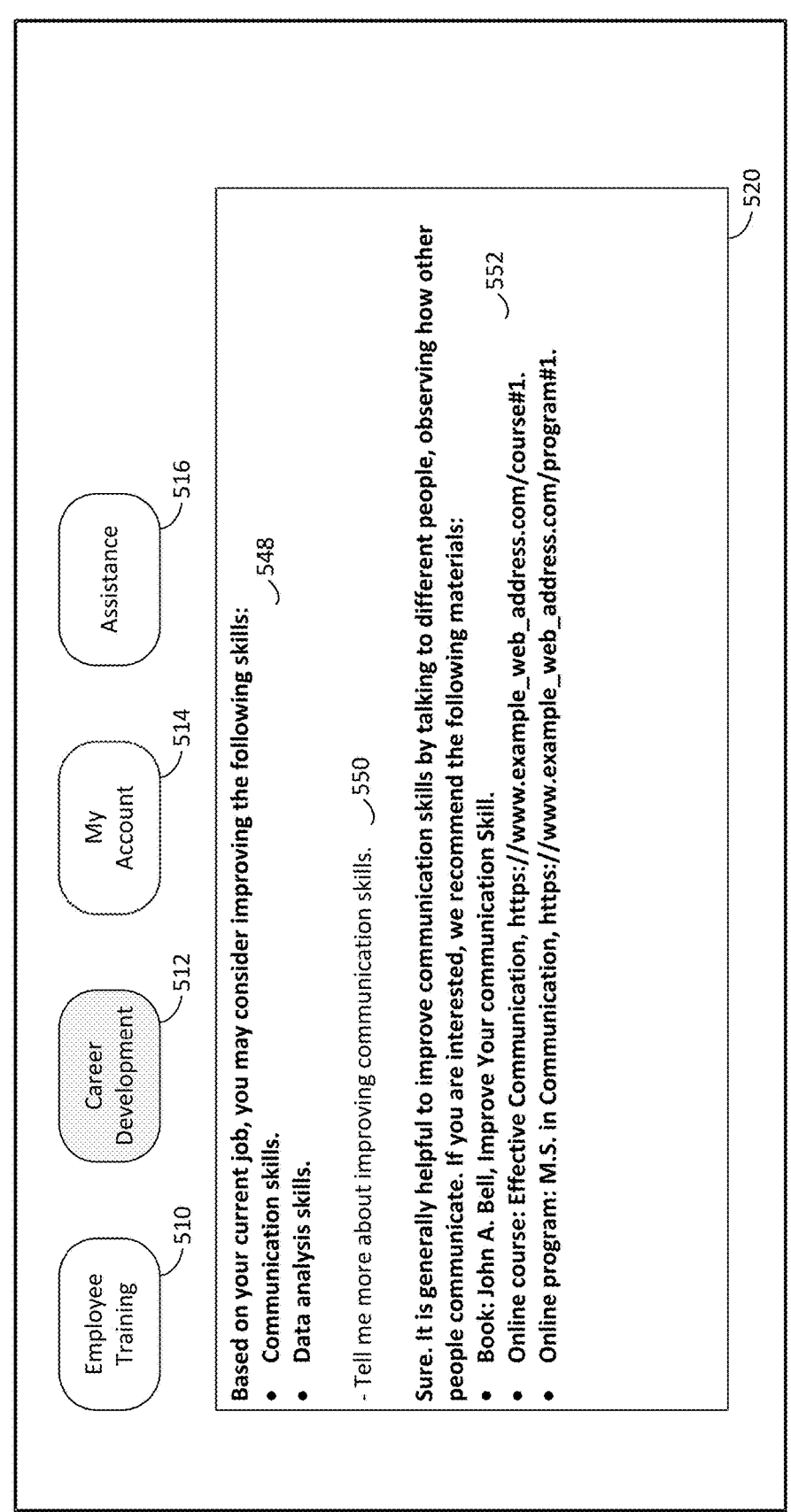

Turning to FIG. 5D, illustrated is an exemplary view of the GUI 500 presented, for example, after the user selected the element 534. As illustrated, in response to the user selection of the element 534, the application may provide skill improvement recommendations 548 via the chat interface 520. In some embodiments, the user may request more information via a response 550. The application may then provide more information and/or recommend materials for the user (such as recommendations 552). In other embodiments, the skill improvement recommendations may include recommended materials by default.

Although not depicted in the figures, the user device 102 may display all or some of the selectable elements 530-534 whenever that is appropriate. For example, the user device 102 may display selectable elements "Recommend job posts" 530 and "Recommend skill improvements" 534 after the application recommends career options to the user. In another example, the user device 102 may display selectable elements "Recommend skill improvements" 534 after the application recommends job posts to the user.

In some embodiments, the user may interact with selectable element 514 to view information associated with the user's account. Such information may include the user's information elements and/or past career development suggestions.

In some embodiments, the user may interact with selectable element 516 to seek assistance from human agents and/or user support chatbots.

B. Exemplary Computer-Implemented Method

Figure 6A:
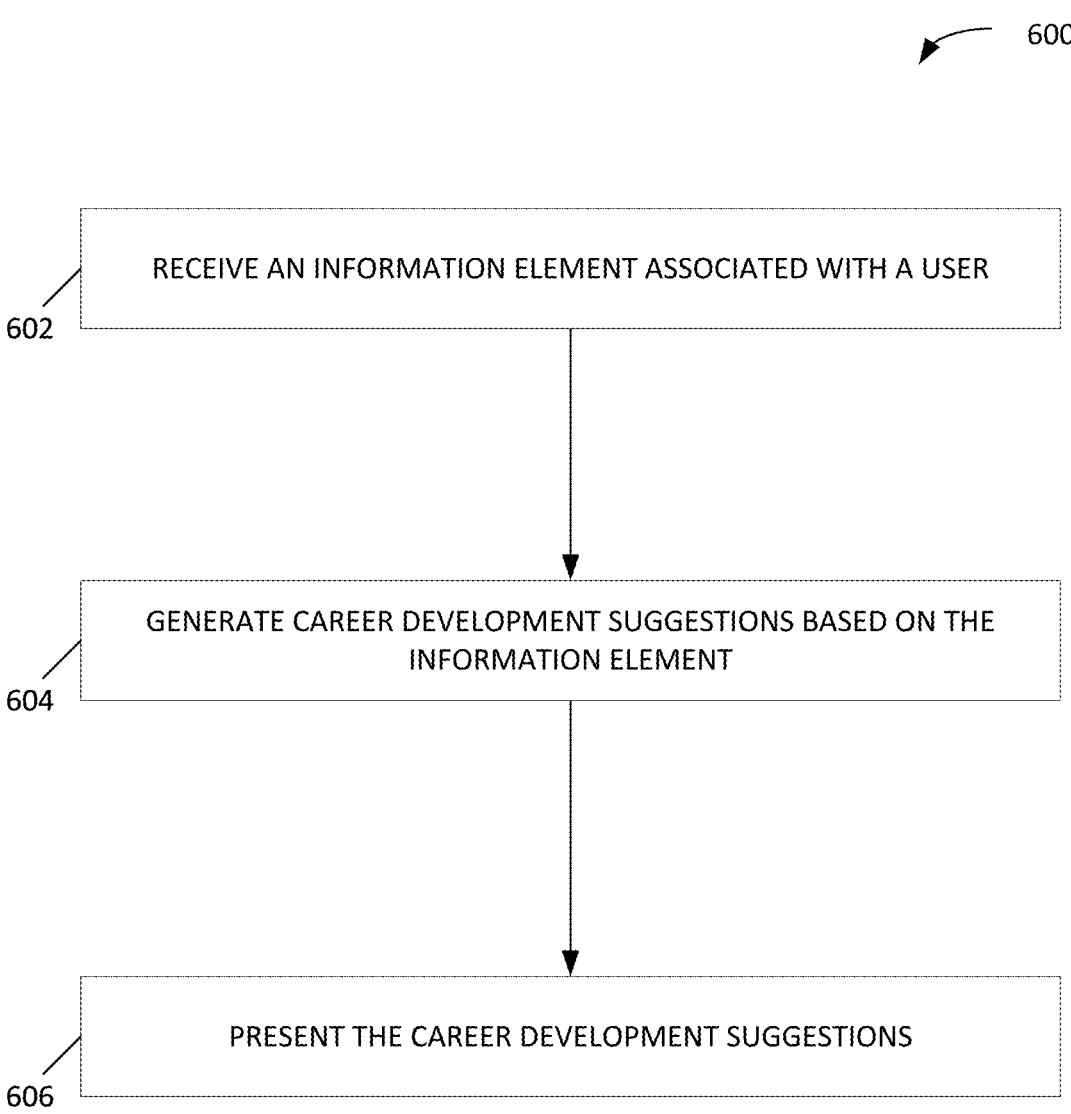
FIG. 6A depicts a flow diagram of an exemplary computer-implemented method for career development according to one embodiment.

FIG. 6A depicts a flow diagram of an exemplary computer-implemented method 600 for providing career development suggestions according to one embodiment. The method 600 may be performed by one or more processors of a server (such as the server 160 of FIG. 1).

The method 600 may begin when a user inputs an information element via a (such as the user device 102 of FIG. 1) running an application disclosed herein. At block 602, the server may receive the information element from the user device. In some embodiments, the information element may be a profile associated with the user, such as the user's resume, the user's work profile (e.g., LinkedIn® profile). In some embodiments, the information element may be the user's work product, such as the user's writing sample, the user's design collection. In some embodiments, the information element may be the user's activities, such as the user's browsing history, social media posts, location history, and/or travel history.

In the scenario where the information element is the user's activities, the server 160 may select career-related activities from the user's general activities and perform further steps disclosed herein based upon the selected activities. More specifically, the server may select, from the user's general activities, a browsing history on job posts, a browsing history on professional contents, social media posts associated with an employer, a colleague, and/or a client of the user, social media posts associated with a professional activity and/or a volunteer activity, a location history during working hours of the user, and/or travel history associated with a workplace of the user. The selection may be based upon semantic analysis of the activities (e.g., analysis of what a social media post is about) and/or the metadata (e.g., location data, tags of people) associated with the activities.

At block 604, the server may generate career development suggestions based upon the information element. In some embodiments, the type of career development suggestions may be determined based upon the user's instructions as described herein above with respect to FIG. 5A. In other embodiments, the type of career development suggestions may be determined based upon a set of rules.

For example, if the information element does not show the user has a dedicated career interest, the server 160 may provide career options by default. Conversely, if the information element shows the user has a dedicated career interest, the server may provide job posts in line with the user's career interest. To this end, the server may extract key words from the user's past experience in the information element, determine a semantic distance between the keywords, and determine whether the user has a dedicated career interest based upon the semantic distance. Alternatively, the server may send the information element to a chatbot (such as the chatbots 150, 250) to determine whether the user has a dedicated career interest. The chatbot may be trained with information elements and corresponding career interests (including no interest) for this purpose.

In some embodiments, the career suggestions are job posts recommended for the user (such as the job posts 536 and 540).

Figure 6B:
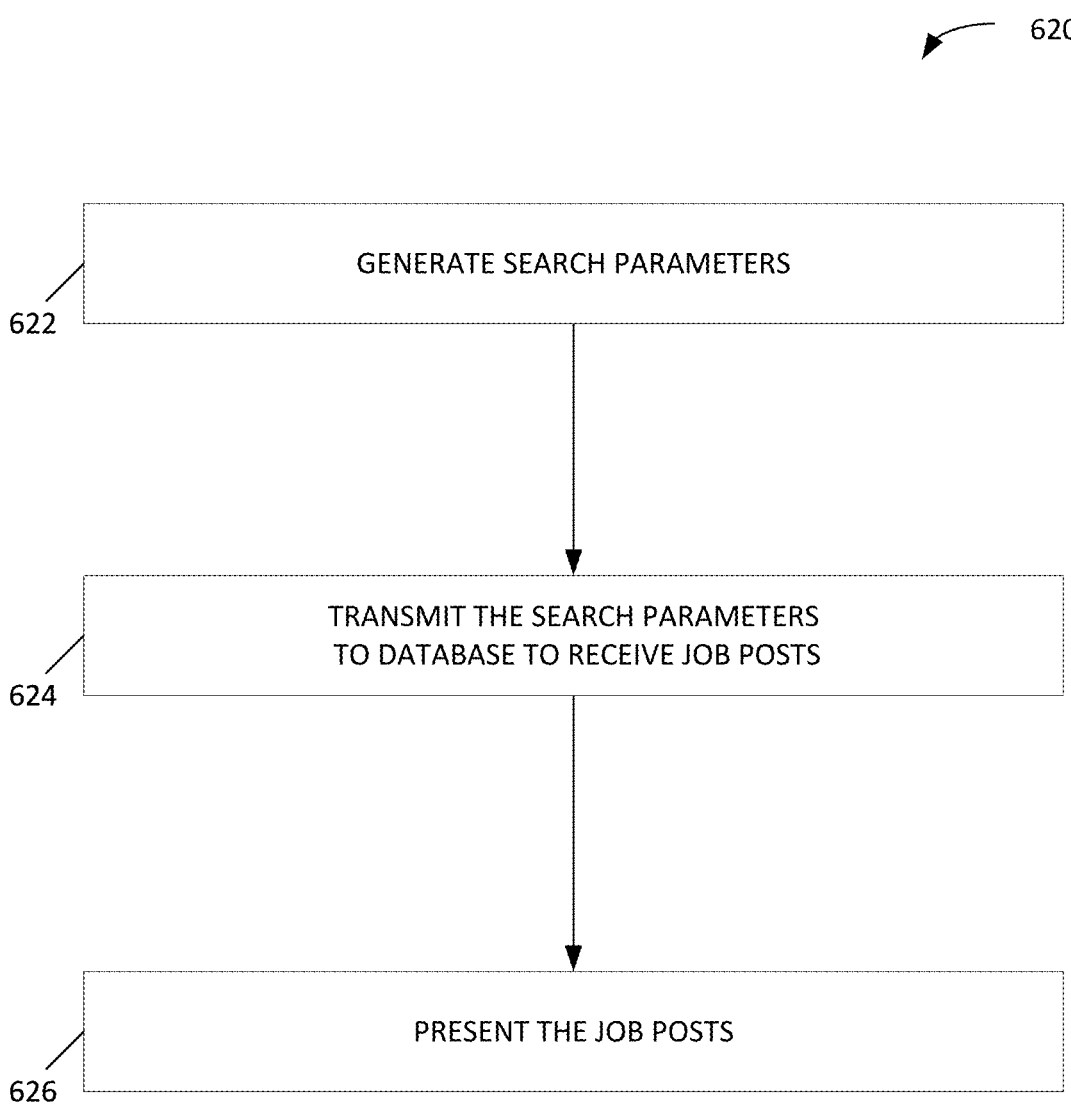
FIG. 6B depicts a flow diagram of an exemplary computer-implemented method for implementing block 604 in FIG. 6A according to one embodiment.

FIG. 6B depicts a flow diagram of an exemplary computer-implemented method 620 for providing job posts according to one embodiment. At block 622, the server may generate search parameters based upon the information element. The one or more search parameters may include a biographical entry, a past and/or current job title, a degree level, a major, an experience level, and/or a skill level.

In some embodiments, the server may send the information element to the chatbot to cause it to generate search parameters associated with the information element. The search parameters may be compliant for use by a particular database. The database may include a plurality of job posts. To this end, the chatbot may be trained with information elements, and search parameters associated with the information elements compliant for use by databases.

In other embodiments, the server may extract keywords from the information element and/or label the information element with keywords using natural language processing techniques (such as via the NLP module 148). For example, the server may assign a weight to each semantic cluster included in the information element using appropriate packages, libraries, and/or machine learning model trained for this purpose. The server may then select the keywords that have overall highest weights as the keywords. The server may further label additional keywords with the information element that have small semantic distances with the selected the keywords. The additional keywords may be retrieved from a keyword database. The server may then use the selected keywords and/or the additional keywords as search parameters.

At block 624, the server may transmit the search parameters to the particular database. The particular database may return one or more job posts using the search parameters. The server may receive the one or more job posts from the particular database. The particular database may be the database 126 or an external database.

At block 626, the server may present an indication of the one or more job posts (such as job recommendations 536) via the user device. In some embodiments, the indication of the one or more job posts may include a brief description of the one or more job posts. In some embodiments, the indication of the one or more job posts may include one or more Uniform Resource Locators (URLs) referring to the one or more job posts.

In some embodiments, the user may request refining the recommended job posts (such as by the response 538). In some instances, the server may update the recommended job posts based upon the user's request (such as via the NLP module 148 and/or the chatbot 150), e.g., filtering out job posts that do not meet the user's instructions. In other instances, the server may update search parameters based upon the user's request and perform another search using the particular database.

Turning back to FIG. 6A, at block 604, in some embodiments, the career development suggestions may be career option recommendations (such as career recommendations 542). In some embodiments, the server may transmit the information element to the chatbot to receive career option recommendations. To this end, the chatbot may be trained with information elements and career options associated with the information elements.

In other embodiments, the server may generate career development options using a trained machine learning model (e.g., via the ML module 140) separate from the chatbot. For example, keywords related to education, past experiences, and corresponding career options extracted from information elements of various users may be encoded into vectors. The vectors may be used to train the machine learning model. The machine learning model may include a set of parameters being updated iteratively during the training process. The encoding and training process may be performed by the server 160 or an external computing device. After the machine learning model is trained, the server may use the trained machine learning model to generate career option recommendations by (1) encoding keywords of the user's information element into vectors, (2) inputting the vectors into the trained machine learning model, (3) receiving vectors associated with career option recommendations, and/or (4) decoding the vectors to obtain the career option recommendations.

In some embodiments, the user may request more information about the career option recommendations (such as by response 544). The server may provide the requested information by sending the request to the chatbot and present the response from the chatbot to the user via the user device. Additionally or alternatively, the server may search for materials related to the requested information. The materials may be texts (e.g., online articles), audios (e.g., podcasts), and/or videos. The searching may be performed in a similar way as described herein above with respect to FIG. 6B.

At block 604, in some embodiments, the career development suggestions may be skill improvement recommendations (such as skill improvement recommendations 548). In some embodiments, the server may transmit the information element to the chatbot to receive skill improvement recommendations. To this end, the chatbot may be trained with information elements and career options associated with the information elements. In other embodiments, the server may generate skill improvement recommendations using a trained machine learning model in a similar manner as described herein above with respect to generating career option recommendations.

At block 606, the server may present career development recommendations to the user via the user device. In some embodiments, the server may update the recommendations and/or provide additional recommendations based upon the user's instructions or updates on the user's information elements.

It should be understood that not all blocks of the exemplary flow diagrams 600 and 620 are required to be performed. It should be also understood that additional and/or alternative steps may be performed.

Additional Considerations

As used herein, the term "user" may refer to an employee or any user using the method, system and/or application disclosed herein.

Unless otherwise indicated, the processes implemented by an ML chatbot may be implemented by an ML voice bot, an AI chatbot, an AI voice bot, and/or a large language model (LLM).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112 (f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing." "computing." "calculating." "determining." "presenting," "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

The systems and methods described herein are directed to an improvement to computer functionality, and improve the functioning of conventional computer systems.

What is claimed is:

1. A computing system for generating accurate career development suggestions via a chatbot, comprising:
   one or more processors, and
   a non-transitory memory storing one or more instructions, the one or more instructions, when executed by the one or more processors, cause the one or more processors to:
   receive, from a user device, an information element associated with a user, the information element comprising a writing sample associated with the user;

generate, via the chatbot, career development suggestions based upon the information element associated with the user, wherein generating the career development suggestions includes:

evaluating, via the chatbot, the writing sample to generate a parameter indicative of a skill level of the user;

based upon the information element associated with the user, generating, via the chatbot, one or more search parameters compliant for use by a particular database, wherein the one or more search parameters comprise the parameter indicative of the skill level of the user;

transmitting, to the particular database, the one or more search parameters to cause the particular database to obtain a search result using the parameter; and generating the career development suggestions based upon the search result; and present, to the user via the user device, the career development suggestions, wherein the chatbot implements a trained model, wherein training the model includes:

creating a first set of vectors associated with first training data;

training the model in a first stage using the first set of vectors;

creating a second set of vectors associated with second training data, wherein the second training data comprises information elements associated with real and/or hypothetical users, prompts for generating career suggestions, and career suggestions associated with the information elements and the prompts; and training the model in a second stage using the second set of vectors.

2. The computing system of claim 1, wherein the information element associated with the user is a profile of the user, and the one or more search parameters include a biographical entry, a past and/or current job title, a degree level, a major, an experience level, and/or a skill level.

3. The computing system of claim 1, wherein the chatbot is further trained with search parameters associated with profiles of the real and/or hypothetical users compliant for use by one or more databases.

4. The computing system of claim 1, wherein:

the information element associated with the user includes a first set of activities of the user, and to generate the career development suggestions, the one or more instructions, when executed by the one or more processors, further cause the one or more processors to:

identify a second set of activities, from the first set of activities, as a profile of the user; and generate, via the chatbot, the career development suggestions based upon the second set of activities.

5. The computing system of claim 4, wherein:

the first set of activities of the user includes a browsing history of the user, one or more social media posts of the user, a location history of the user, and/or travel history of the user; and the second set of activities of the user includes a browsing history on job posts, a browsing history on professional contents, social media posts associated with an employer, a colleague, and/or a client of the user, social media posts associated with a professional activity and/or a volunteer activity, a location history during working hours of the user, and/or travel history associated with a workplace of the user.

6. The computing system of claim 1, wherein the career development suggestions are career options recommended for the user, skill improvements recommended for the user, and/or online courses and/or programs recommended for the user.

7. The computing system of claim 6, wherein the chatbot is further trained with career options associated with the information elements of the real and/or hypothetical users, skill improvement recommendations associated with the information elements of the real and/or hypothetical users, and search parameters associated with the information elements of the real and/or hypothetical users compliant for use by databases including online courses and/or programs.

8. The computing system of claim 1, wherein creating the first set of vectors associated with the first training data includes:

extracting text from documents;

splitting the text into semantic clusters; and encoding the semantic clusters as the first set of vectors, wherein a distance between the first set of vectors depends on a relevance between the semantic clusters corresponding to the first set of vectors.

9. The computing system of claim 8, wherein encoding the semantic clusters as input vectors is further via a machine learning (ML) model comprising a plurality of parameters, the ML model being trained with articles comprising a plurality of semantic clusters, the plurality of parameters being iteratively updated during training.

10. The computing system of claim 8, wherein at least one of the semantic clusters is one or more words, a portion of a word, or a character.

11. The computing system of claim 1, wherein the one or more search parameters are indicative of one or more characteristics of the user, and generating the one or more search parameters includes causing the chatbot to:

encode the information element to generate first one or more vectors indicative of content of the writing sample;

generate, based upon the first one or more vectors, second one or more vectors indicative of the skill level of the user; and decode the second one or more vectors to generate the parameter indicative of the skill level.

12. A computer-implemented method for generating accurate career development suggestions via a chatbot, comprising:

receiving, by one or more processors from a user device, an information element associated with a user, the information element comprising a writing sample associated with the user;

generating, by the one or more processors via the chatbot, career development suggestions based upon the information element associated with the user, wherein generating the career development suggestions includes:

evaluating, via the chatbot, the writing sample to generate a parameter indicative of a skill level of the user;

based upon the information element associated with the user, generating, via the chatbot, one or more search parameters compliant for use by a particular database, wherein the one or more search parameters comprise the parameter indicative of the skill level of the user;

transmitting, to the particular database, the one or more search parameters to cause the particular database to obtain a search result using the parameter; and generating the career development suggestions based upon the search result; and presenting, by the one or more processors to the user via the user device, the career development suggestions, wherein the chatbot implements a trained model, wherein training the model includes:

creating a first set of vectors associated with first training data;

training the model in a first stage using the first set of vectors;

creating a second set of vectors associated with second training data, wherein the second training data comprises information elements associated with real and/or hypothetical users, prompts for generating career suggestions, and career suggestions associated with the information elements and the prompts; and training the model in a second stage using the second set of vectors.

13. The computer-implemented method of claim 12, wherein the information element associated with the user is a profile of the user, and the one or more search parameters include a biographical entry, a past and/or current job title, a degree level, a major, an experience level, and/or a skill level.

14. The computer-implemented method of claim 12, wherein the chatbot is further trained with search parameters associated with profiles of the real and/or hypothetical users compliant for use by one or more databases.

15. The computer-implemented method of claim 12, wherein the career development suggestions are career options recommended for the user, skill improvements recommended for the user, and/or online courses and/or programs recommended for the user.

16. The computer-implemented method of claim 15, wherein the chatbot is further trained with career options associated with the information elements of the real and/or hypothetical users, skill improvement recommendations associated with the information elements of the real and/or hypothetical users, and search parameters associated with the information elements of the real and/or hypothetical users compliant for use by databases including online courses and/or programs.

17. A non-transitory computer-readable storage medium storing computer-readable instructions for generating accurate career development suggestions via a chatbot, wherein the computer-readable instructions, when executed on one or more processors of a user device, cause the one or more processors to:

receive, from a user device, an information element associated with a user, the information element comprises a writing sample associated with the user;

generate, via the chatbot, career development suggestions based upon the information element associated with the user, wherein generating the career development suggestions includes:

evaluating, via the chatbot, the writing sample to generate a parameter indicative of a skill level of the user;

based upon the information element associated with the user, generating, via the chatbot, one or more search parameters compliant for use by a particular database, wherein the one or more search parameters comprise the parameter indicative of the skill level of the user;

transmitting, to the particular database, the one or more search parameters to cause the particular database to obtain a search result using the parameter; and generating the career development suggestions based upon the search result; and present, to the user via the user device, the career development suggestions, wherein the chatbot implements a trained model, wherein training the model includes:

creating a first set of vectors associated with first training data;

training the model in a first stage using the first set of vectors;

creating a second set of vectors associated with second training data, wherein the second training data comprises information elements associated with real and/or hypothetical users, prompts for generating career suggestions, and career suggestions associated with the information elements and the prompts; and training the model in a second stage using the second set of vectors.

*     *     *     *     *